United States Patent
Conaway

(10) Patent No.: US 6,484,369 B1
(45) Date of Patent: Nov. 26, 2002

(54) POSITIONING DEVICE FOR VEHICLE SEAT BELT ASSEMBLY

(76) Inventor: Brian J. Conaway, 1827 King Ave., Columbus, OH (US) 43212

( * ) Notice: Subject to any disclaimer, the term of this patent is extended or adjusted under 35 U.S.C. 154(b) by 70 days.

(21) Appl. No.: 09/650,574

(22) Filed: Aug. 30, 2000

Related U.S. Application Data

(60) Provisional application No. 60/198,113, filed on Apr. 18, 2000.

(51) Int. Cl.[7] .................. A44B 11/14; A62B 35/02; B60R 22/34
(52) U.S. Cl. .................. 24/163 R; 24/196; 24/633; 297/483
(58) Field of Search ................. 24/163 R, 196, 24/633; 297/483; 280/808

(56) References Cited

U.S. PATENT DOCUMENTS

| | | | |
|---|---|---|---|
| 3,713,693 A | | 1/1973 | Cadiou |
| 3,957,283 A | * | 5/1976 | Pocobello .................. 280/747 |
| 4,146,268 A | * | 3/1979 | Bost ............................ 297/389 |
| 4,180,283 A | | 12/1979 | Ziv |
| 4,236,755 A | | 12/1980 | Pollitt et al. |
| 4,289,352 A | | 9/1981 | Ashworth |
| 4,294,467 A | | 10/1981 | Frantom |
| 4,473,926 A | | 10/1984 | Ono |
| 4,609,205 A | | 9/1986 | McKeever |
| 4,786,078 A | | 11/1988 | Schreier et al. |
| 4,796,919 A | | 1/1989 | Linden |
| 4,826,250 A | | 5/1989 | Ibanez |
| 4,840,325 A | | 6/1989 | Higuchi et al. |
| 4,886,318 A | | 12/1989 | Pennock |
| 4,944,557 A | | 7/1990 | Tsubai |
| 4,951,965 A | | 8/1990 | Brown |
| 5,000,481 A | | 3/1991 | Willson |
| 5,154,446 A | | 10/1992 | Blake |
| 5,178,439 A | | 1/1993 | McCracken |
| 5,201,099 A | | 4/1993 | Campbell |
| 5,255,940 A | | 10/1993 | Kornblum et al. |
| 5,265,910 A | | 11/1993 | Barr et al. |
| 5,335,957 A | | 8/1994 | Golder |
| 5,340,198 A | | 8/1994 | Murphy et al. |

(List continued on next page.)

FOREIGN PATENT DOCUMENTS

| | | | | |
|---|---|---|---|---|
| DE | 3540171 | * | 5/1987 | .................. 24/633 |
| FR | 2 290 919 | | 6/1976 | |
| GB | 1153953 | * | 6/1969 | .................. 24/196 |

OTHER PUBLICATIONS

International Search Report mailed Aug. 21 in PCT/US 01/12115.

*Primary Examiner*—Victor Sakran
(74) *Attorney, Agent, or Firm*—Carter & Schnedler, P.A.

(57) ABSTRACT

Positioning devices for improving the fit, comfort and crash protection provided to users, particularly children, of Type II vehicle seat belt assemblies which include webbing connected to a retraction device and extending at a relatively upper end from a force diverter such as a pillar loop and secured to an anchor at a relatively lower end, with a latch plate insertable into a buckle and having a slotted opening through which the webbing slides to define a shoulder belt portion between the upper force diverter and the latch plate, and a lap belt portion between the lower anchor end and the latch plate. One disclosed positioning device includes a clamping element frictionally engagable with the shoulder belt portion and positionable immediately adjacent the latch plate so as to maintain the lap belt portion in a desired snug condition when the latch plate is inserted into the buckle by preventing sliding of the webbing through the opening in a direction which would loosen the lap belt portion, while permitting sliding of the webbing through the opening in a direction which would further tighten the lap belt portion. Another disclosed positioning device includes a shoulder belt repositioning element attached to the clamping element.

23 Claims, 21 Drawing Sheets

U.S. PATENT DOCUMENTS

| | | |
|---|---|---|
| 5,421,614 A | 6/1995 | Zheng |
| 5,579,561 A | 12/1996 | Smith et al. |
| 5,605,380 A | 2/1997 | Gerstenberger et al. |
| 5,649,341 A | 7/1997 | Ashline et al. |
| 5,692,806 A | 12/1997 | Jones |
| 5,733,013 A * | 3/1998 | Brown ........................ 297/483 |
| 5,791,688 A | 8/1998 | Koledin |

* cited by examiner

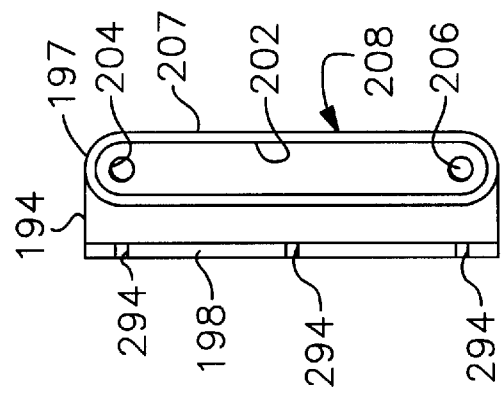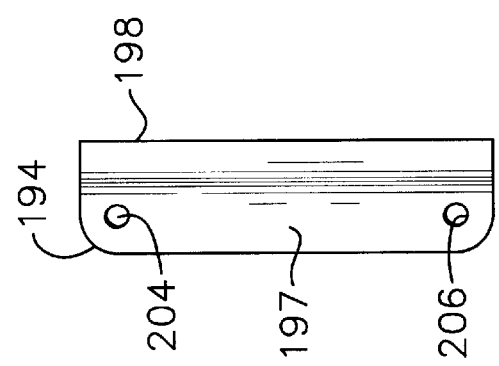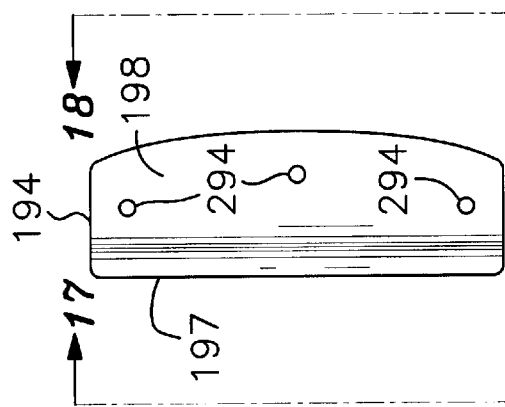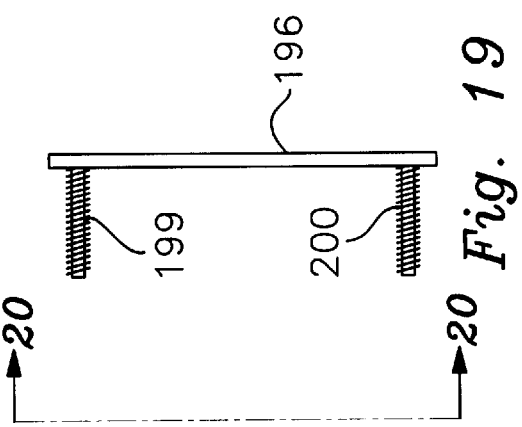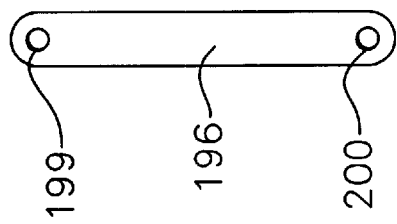

POSITIONING DEVICE FOR VEHICLE SEAT BELT ASSEMBLY

CROSS-REFERENCE TO PROVISIONAL PATENT APPLICATION

The benefit of U.S. Provisional Patent Application Ser. No. 60/198,113, filed Apr. 18, 2000, is claimed.

BACKGROUND OF THE INVENTION

The invention relates generally to Type II vehicle seat belt assemblies which include webbing connected to a retraction device and extending at a relatively upper end from a force diverter such as a pillar loop and secured to an anchor at a relatively lower end, with a latch plate insertable into a buckle and having a slotted opening through which the webbing slides to define a shoulder belt portion between the upper force diverter and the latch plate, and a lap belt portion between the lower anchor end and the latch plate. The invention more particularly relates to positioning devices for improving the fit, comfort and crash protection provided to the user, particularly, but not limited to, children.

Conventional seat belt assemblies, which include a lap belt and a diagonally-extending shoulder strap, are designed primarily for use by adults of average size.

One of the leading causes of injury and death to smaller users of the approved Type II vehicle seat belt assemblies is the lap belt being loose or out of position across the abdomen of the user. Such improper lap belt position, on or above the iliac crest of the user, can result from several potential conditions. One potential condition is an adolescent child user moving forward along the horizontal seating surface in order to allow his or her knees to bend over the front edge of the seat. Another potential condition is the user pulling down on the shoulder belt, deliberately producing "slack," allowing the shoulder belt to slide down through the slot in the lap plate, resulting in a loose or improperly fitting lap belt, shoulder belt, or both. Although this allows the user to sit in a more "relaxed" forward or slouched position on the seating surface, it can result in the lap belt being loose, positioned high on the abdomen, or both. Moreover, correct shoulder belt positioning is often compromised by such a "relaxed" seating position. In the event of an accident, the loose or improper belt position results in much higher rates of injury and death.

In addition, when the seat belt assembly is used by a child or smaller adult, the shoulder strap typically extends across the neck or face of the child because his or her upper body is not quite as long as that of a taller individual. In other words, the shoulder belt often rests too far inboard and rubs on the neck of the user. This can cause discomfort. In addition, to relieve the discomfort, children often place the shoulder belt under the arm or behind the back, such that there is no upper body restraint during an accident. Again, higher rates of injury and death can result.

A variety of shoulder belt repositioners or "adjusters," particularly for use by children, have been proposed, and several have been commercially produced. Examples are disclosed in McCracken U.S. Pat. No. 5,178,439; Kornblum et al U.S. Pat. No. 5,255,940; Barr et al U.S. Pat. No. 5,265,910; Vicanti U.S. Pat. No. 5,275,468; Golder U.S. Pat. No. 5,335,957 and Zheng U.S. Pat. No. 5,421,614. Many of these shoulder strap repositioners or "adjusters" realize their "adjustment" through some interaction with the lap belt. In particular, interaction with the lap belt tends to pull the lap belt up towards the abdomen of the user. The lap belt is free to move up, as the retraction device releases webbing which slides through the slotted opening in the latch plate.

In addition, some of the available shoulder belt "adjuster" products allow improper adjustment positions for the shoulder belt which could result in injury, by allowing the position of the shoulder belt to be adjusted either too far inboard, or riding on the shoulder or off the torso altogether.

SUMMARY OF THE INVENTION

It is therefore seen to be desirable to improve the protection afforded to all users of the Type II vehicle seat belt assemblies.

It is also seen to be desirable to not compromise the effectiveness of the Type II seat belt assembly.

In an exemplary embodiment of the invention a positioning device includes a clamping element frictionally engagable with the shoulder belt portion and positionable immediately adjacent the latch plate so as to maintain the lap belt portion in a desired snug condition when the latch plate is inserted into the buckle by preventing sliding of the webbing through the opening in a direction which would loosen the lap belt portion, while permitting sliding of the webbing through the opening in a direction which would further tighten the lap belt portion.

Another embodiment of the invention includes a shoulder belt repositioning element attached to the clamping element.

BRIEF DESCRIPTION OF THE DRAWINGS

While the novel features of the invention are set forth with particularity in the appended claims, the invention, both as to organization and content, will be better understood and appreciated, from the following detailed description taken into conjunction with the drawings, in which:

FIG. 2 is an enlarged side elevational view taken on line 2—2 of FIG. 1;

FIG. 16 is a top view of the back portion of the clamp element of the positioning device of FIG. 9;

FIG. 17 is a front view showing the web-facing surface of the clamp element back portion, taken on line 17—17 of FIG. 16;

FIG. 18 is a back side view of the clamp element back portion, taken on line 18—18 of FIG. 16;

FIG. 19 is a side view of a metal support plate with threaded posts received by the clamp element back portion of FIGS. 16 and 17;

FIG. 20 is a view taken on line 20—20 of FIG. 19;

DETAILED DESCRIPTION

Figure 1:
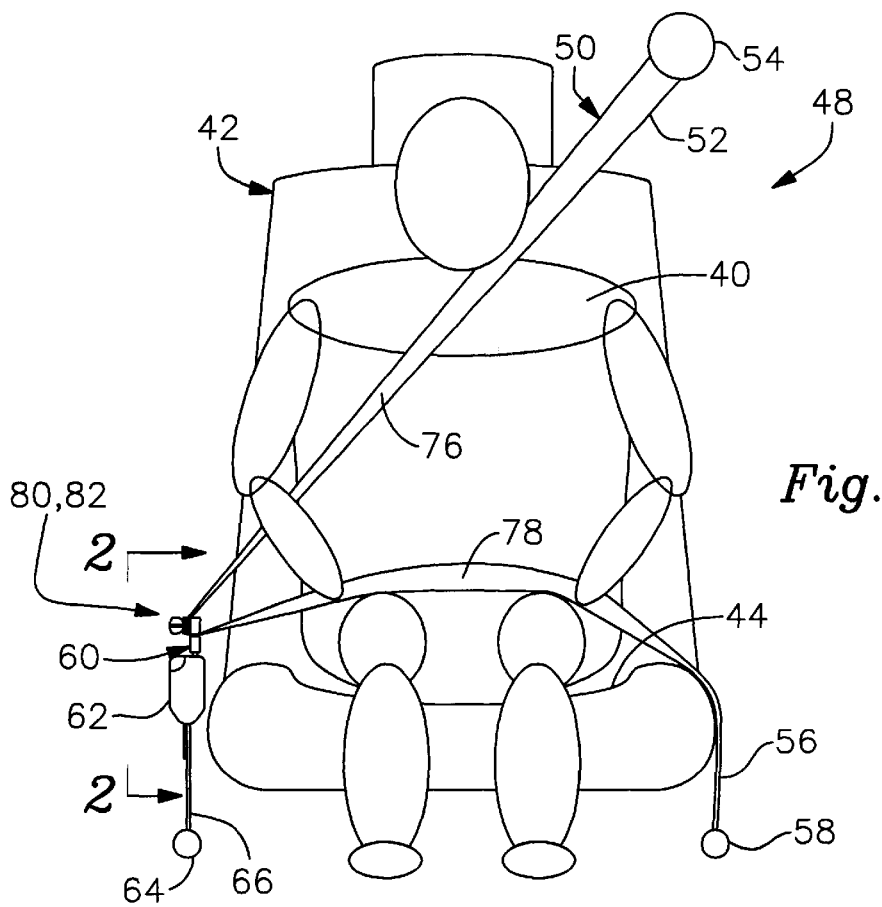
FIG. 1 is a front elevational view showing a positioning device embodying the invention in use in a buckled-up configuration.

Referring first to FIG. 1, a child 40 or an adult of short stature is seated in a vehicle seat 42 having a seating surface 44 and a back rest 46. The seat 42 is equipped with a conventional Type II vehicle seat belt assembly, generally designated 48, including a continuous length of webbing 50 connected to a retraction device and extending at a relatively upper end 52 from a force diverter such as a pillar loop. In FIG. 1, the force diverter is designated 54, and the retraction device may either be co-located or located elsewhere (not shown) in the vehicle, such as near the floor, or within the so-called "B-pillar." The webbing 50 is secured at a relatively lower end 56 to an anchor 58.

The retraction device includes a windup reel which typically maintains the webbing 50 under slight tension, as well as an inertial locking device (not shown) which locks up the retraction device in the event of a collision. The location of the force diverter 54 depicted in FIG. 1 at the relatively upper end 52 of the webbing 50 is the point at which force from the retraction device is effectively applied, particularly in the event of a collision when the inertial locking device locks up.

Figure 3:
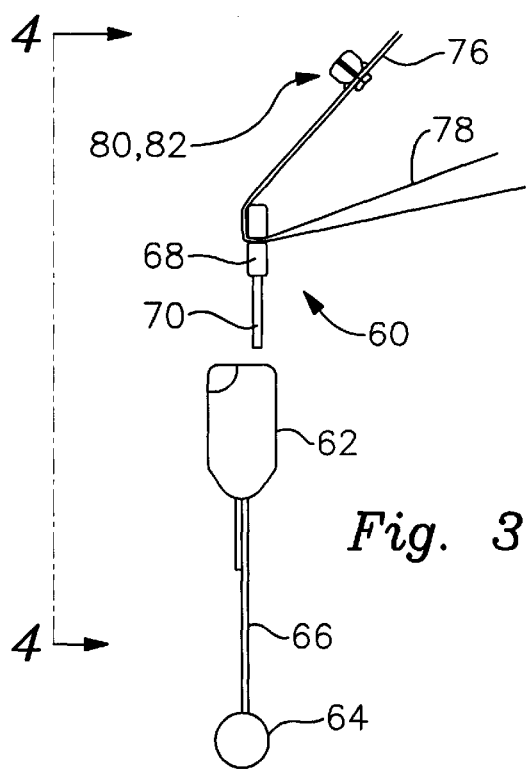
FIG. 3 is an enlarged front elevational view in the same orientation as FIG. 1 showing the seat belt latch plate being inserted into the seat belt buckle.
Figure 4:
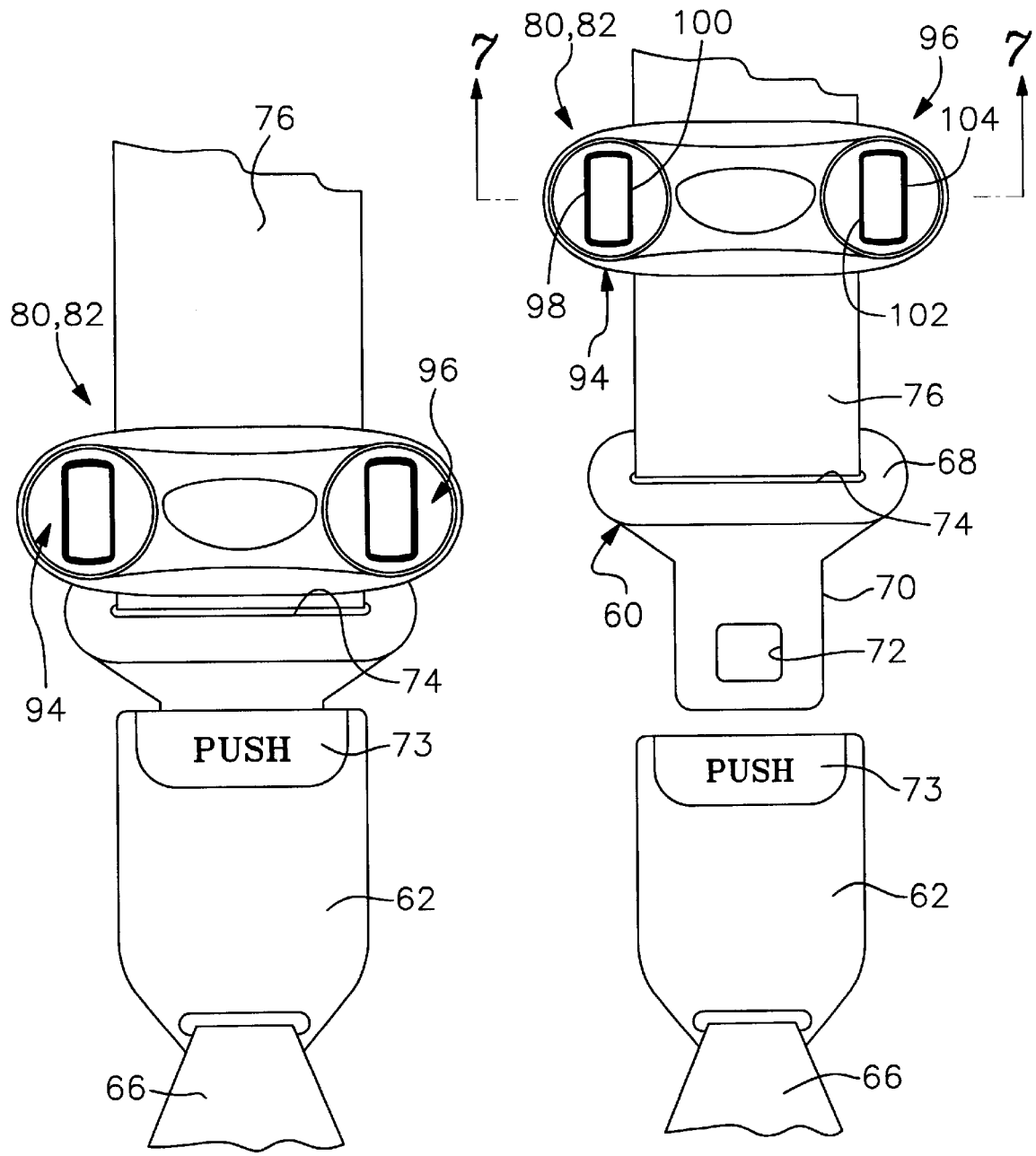
FIG. 4 is an enlarged side elevational view taken on line 4—4 of FIG. 3.

Referring to FIGS. 2, 3 and 4, in addition to FIG. 1, the vehicle seat belt assembly 48 further includes a latch plate 60 insertable into a buckle 62, which is secured to another anchor point 64 via a connecting strap 66. The latch plate 60 has a handle portion 68, typically comprising plastic, and a metal tongue portion 70 which is inserted into the buckle 62. The buckle 62 has internal elements (not shown) for engaging the tongue portion 70 via an aperture 72 in the tongue portion 70. The buckle 62 has a PUSH button 73 for releasing the tongue portion 70.

The latch plate 60, in particular the handle portion 68, has a slotted opening 74 through which the webbing 50 slides to define a shoulder belt portion 76 between the relatively upper end 52 and the latch plate 60, and a lap belt portion 78 between the relatively lower end 56 and the latch plate 60.

In view of the continuous nature of the webbing 50, which freely slides through the slotted opening 74, the portion of the webbing 50 which is defined as the shoulder belt portion 76 and the portion defined as the lap belt portion 78 vary depending upon the size of the individual, and the manner in which the seat belt assembly 48 is adjusted. In particular, it is quite possible for the webbing 50 to slide through the slotted opening 74 in a direction which loosens the lap belt portion 78. As noted hereinabove, this condition can result when an adolescent child user moves forward along the horizontal seating surface 44 in order to allow his or her knees to bend over the edge of the seat, or when the user deliberately pulls down on the shoulder belt portion 76, withdrawing webbing 50 from the retraction device through the force diverter 54, in order to achieve a more "relaxed" forward or slouched position on the seating surface 44. These conditions can result in the lap belt portion 78 being loose or positioned too high on the abdomen, resulting in a greater likelihood of injury in the event of an accident. In addition, such a "relaxed" seating position compromises correct placement of the shoulder belt portion 76.

A positioning device embodying the invention and generally designated 80 comprises a clamping element 82 which is frictionally engagable with the shoulder belt portion 76 of the webbing 50 between the latch plate 60 and the force diverter 54 and, more particularly, immediately adjacent the latch plate 60. The clamping element 82 is sufficiently large such that it cannot pass through the slotted opening 74 in the latch plate 60.

The clamping element 82, when so positioned, and assuming the latch plate 60 is inserted into the buckle 62, maintains the lap belt portion 78 in a desired snug condition by preventing sliding of the webbing 50 through the slotted opening 74 in a direction which would loosen the lap belt portion 78, while permitting sliding of the webbing 50 through the slotted opening 74 in a direction which would further tighten the lap belt portion 78.

Figure 7:
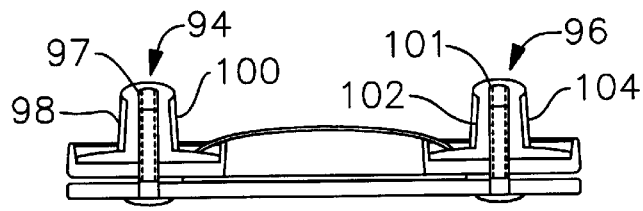
FIG. 7 is a cross-sectional view taken on line 7—7 of FIG. 4.
Figure 8:
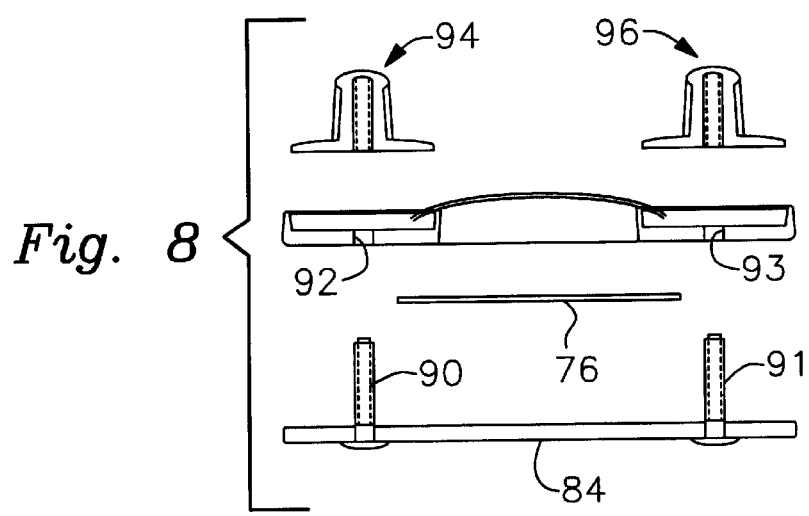
FIG. 8 is an exploded view corresponding to FIG. 7.

Referring in particular to the cross sectional view of FIG. 7 and to the corresponding exploded view of FIG. 8, the clamping element 82 includes a back portion 84 and a cover portion 86 positionable on opposite sides of the webbing of the shoulder belt portion 76, and an adjustable tightening device, generally designated 88, connected to the back portion 84 and to the cover portion 86 for developing a clamping force between the back portion 84 and the cover portion 86 to effect frictional engagement with the webbing of the shoulder belt portion 76. Suitable textured surfaces (not shown) on the back portion 84, the cover portion 86, or both may be provided to enhance frictional engagement with the webbing of the shoulder belt portion 76.

In the embodiment of FIGS. 1–8, the back portion 84 takes the form of a plate-like element. The adjustable tightening device 88 comprises a pair of threaded posts 90 and 91 extending from the plate-like back portion 84 through apertures 92 and 93 in the cover portion 86, and spaced sufficiently far apart to accommodate the width of the shoulder belt portion 76 webbing. The adjustable tightening device 88 additionally includes a pair of corresponding threaded knobs 94 and 96. To aid in gripping, the threaded knob 94 has a wing element 97 with flattened side surfaces 98 and 100, and the threaded knob 96 has a wing element 101 with flattened side surfaces 102 and 104. As the knobs 94 and 96 are tightened, respective lower surfaces 106 and 108 of the knobs 94 and 96 bear against corresponding surfaces 110 and 112 on generally visible surface 114 of the top plate 86 so as to provide the clamping force when knobs 96 and 94 are tightened.

In preparation for use of the positioning device 80, the threaded knobs 94 and 96 are loosened or removed as required. The back portion 84 and cover portion 86 are assembled on the shoulder belt portion 76, with the knobs 94 and 96 initially loosely in position.

The child 40 is seated in the vehicle seat 42, properly positioned in the center of the seat 42, with the tail bone firmly against the back rest 46. As depicted in FIGS. 3 and 4, the latch plate 60 is then inserted into the buckle 62, in a normal manner.

Figure 5:
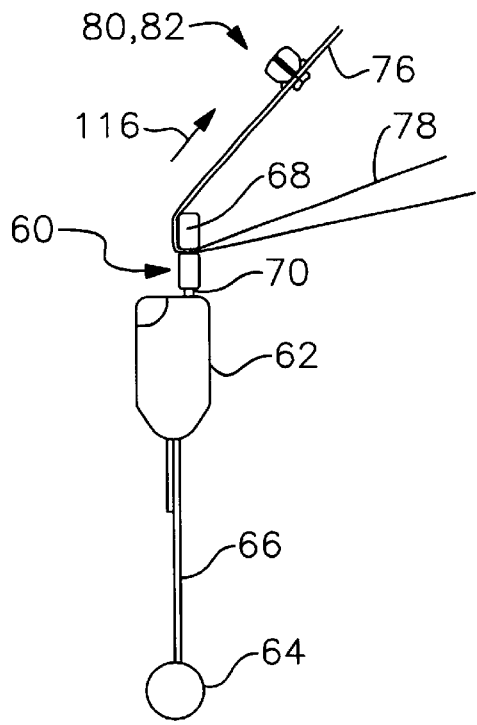
FIG. 5 is a view like that of FIG. 4 depicting adjustment of the positioning device.

With reference to FIG. 5, for adjustment, the user or a parent then pulls upwardly on the shoulder belt portion 76 in the direction of the arrow 116, thus removing any slack in the lap belt portion 78. The user or parent continues to pull until the lap belt portion 78 is in the correct "snug" position to hold the child 40 in the optimum rearward seating position, with the lap belt portion 78 in the optimum position for the anatomy of the particular child 40, below the iliac crest.

Figure 6:
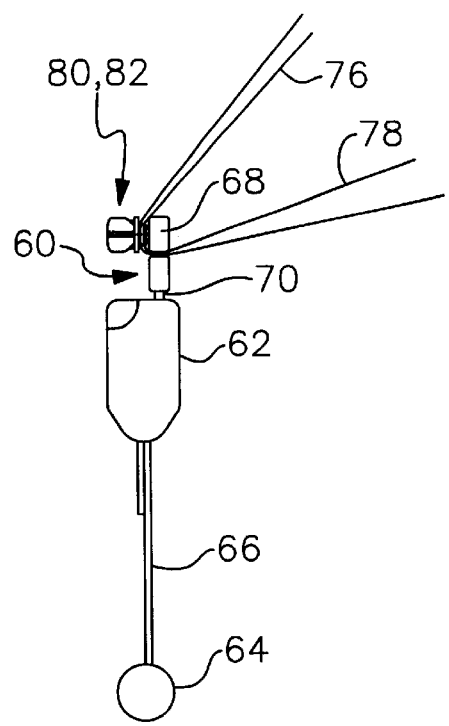
FIG. 6 is a view like FIG. 3, in the buckled-up and adjusted configuration.

With reference to FIGS. 2 and 6, at this point, while still holding upward tension on the shoulder belt portion 76, the clamping element 82 is slid down along the shoulder belt portion 76 towards the latch plate 60. Once positioned against the latch plate 60, immediately adjacent the slotted opening 74, the clamping element 82 is locked in position by tightening the threaded knobs 94 and 96 of the adjustable tightening device 88 to provide sufficient clamp force so as to frictionally maintain the clamping device 88 in position relative to the shoulder belt portion 76.

In this position, it is still possible to tighten the lap belt portion 78 further by pulling on the shoulder belt portion 76, as the clamping element 82 is free to travel up with the shoulder portion 76. The lap belt portion 78 is, however, not allowed to loosen beyond the set "snug" position, as the clamping element 82 does not allow the shoulder belt portion 76 to travel back down through the slotted opening 74 in the latch plate 80 past the clamped position of the clamping element 82.

Accordingly, the normal function of the Type II seat belt assembly 48 is not adversely affected, allowing it to function as designed, while at the same time providing a much more secure, consistent and safer fit. Thus, the child 40 is held in the correct position by the properly snug lap belt portion 78 at all times. Impact-related injury due to improper fit, excess belt slack, or both is greatly reduced.

In addition, the positioning device 80, by keeping the lap belt portion 78 "snug", holds the child 40 more securely in the seat 42 during a roll-over, and reduces the possibility of the child 40 being ejected from the vehicle in the event of an accident.

Moreover, the seat belt assembly 48 releases as usual when the release PUSH button 73 on the buckle 62 is pressed. The positioning device 80 remains in the correct position for the next use by the specific user, with no additional fitting required at that time.

The positioning device 80 of FIGS. 1–8 can also be used in conjunction with a conventional shoulder strap repositioner or "adjuster," such as is disclosed in Golder U.S. Pat. No. 5,335,957, to enhance the operation of the shoulder belt "adjuster" by alleviating the problem of interaction with the lap belt portion 78. Thus, typical shoulder belt "adjusters" tend to pull up on the lap belt portion 78, which is quite easy to do in the absence of a positioning device like the positioning device 80 embodying the invention because the seat belt webbing 50 is free to slide through the slotted opening 74 in the latch plate 60.

Embodiments of the invention may include a shoulder strap repositioning element, which may also be termed an "adjuster," in addition to a clamping element like the clamping element 82 of the positioning device 80 embodiment of FIGS. 1–8.

Figure 9:
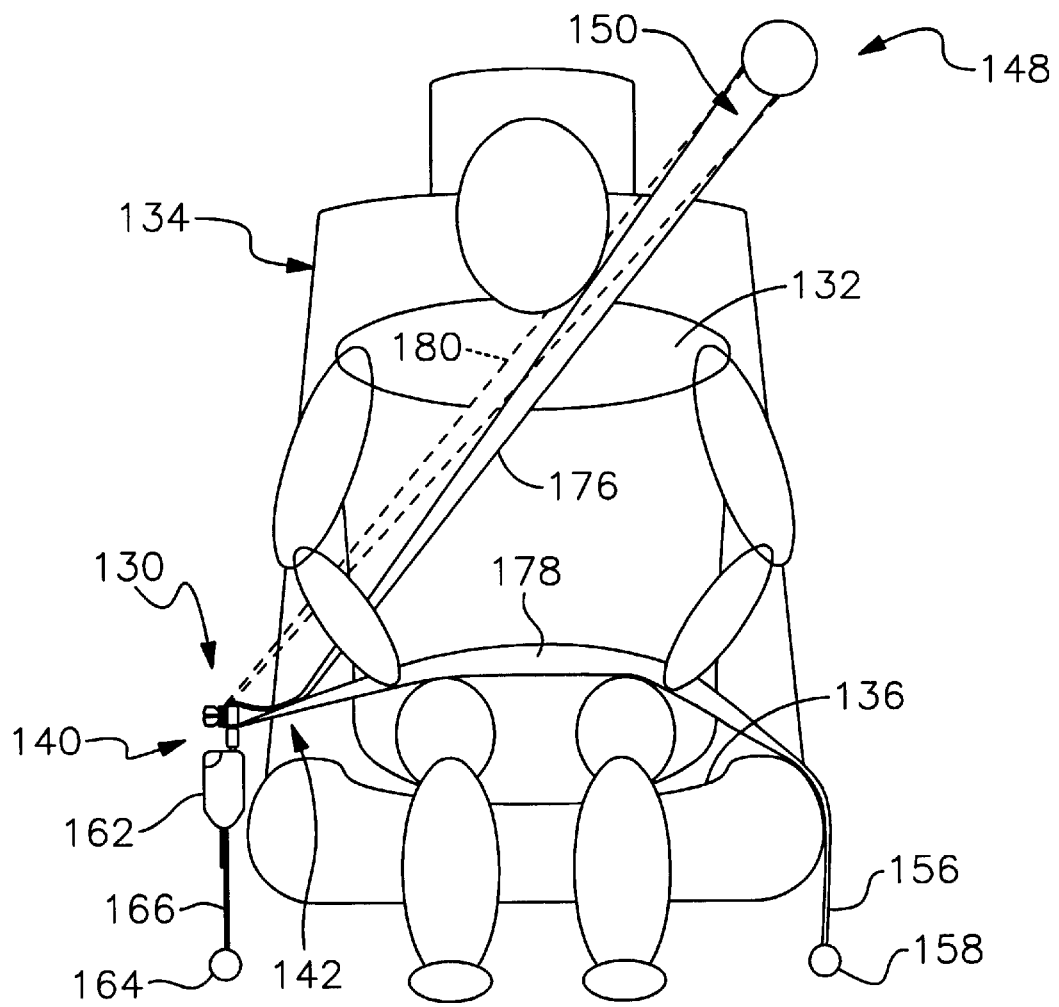
FIG. 9 is a front elevational view showing another positioning device embodying the invention in use in a buckled-up condition with an older child.
Figure 10:
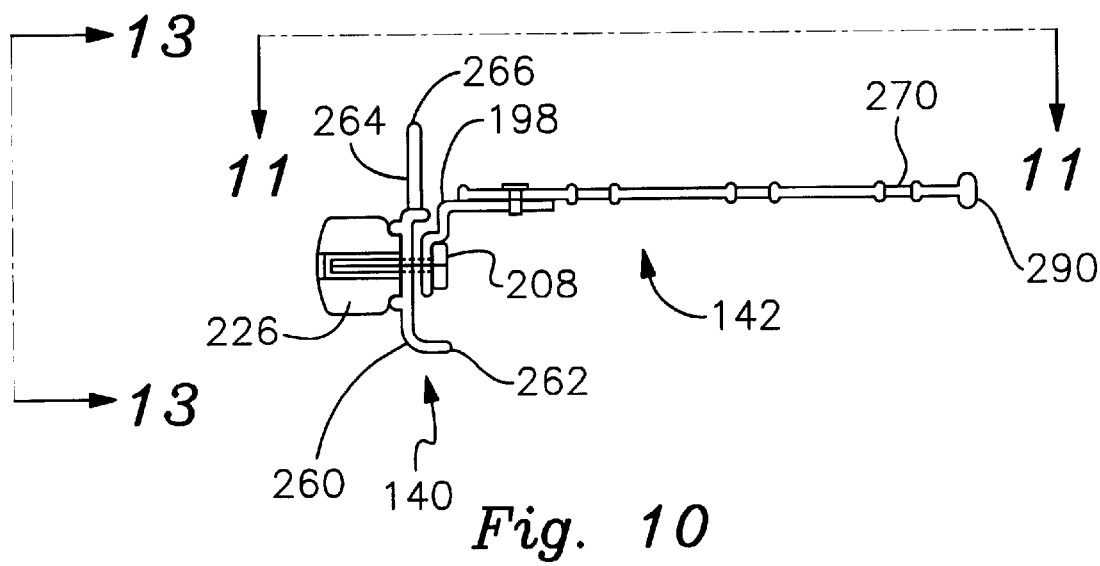
FIG. 10 is a side elevational view of the positioning device of FIG. 9 prior to installation and use.

FIG. 9 is a front elevational view showing another positioning device 130 embodying the invention, described hereinbelow with reference to FIGS. 9–26. In FIG. 9, the positioning device 130 is shown in use in a buckled-up condition with an adolescent or older child 132 seated in a vehicle seat generally designated 134 having a seating surface 136 and a back rest 138. The positioning device 130 includes a clamping element 140, which functions generally in the same manner as the clamping element 82 of the positioning device 80 of FIGS. 1–8 described hereinabove, and in addition includes a shoulder belt repositioning element 142. The positioning device 130 thus, in addition to maintaining optimum lap belt positioning, provides improved shoulder belt positioning.

The vehicle seat 134 likewise includes a seat belt assembly, generally designated 148, including a continuous length of webbing 150 connected to a retraction device and extending at a relatively upper end 152 from a force diverter such as a pillar loop, in the same manner as the seat belt assembly 48 described hereinabove with reference to FIG. 1. In FIG. 9, the force diverter is designated 154, and the retraction device may either be co-located or located elsewhere (not shown) in the vehicle. The webbing 150 is secured at a relatively lower end 156 to an anchor 158.

The retraction device includes a windup reel which typically maintains the webbing 150 under slight tension, as well as an inertial locking device (not shown) which locks up the retraction device in the event of a collision.

The vehicle seat belt assembly 148 in addition includes a latch plate 160 insertable into a buckle 162, which is secured to another anchor point 164 via a connecting strap 166. The latch plate 160 has a handle portion 168, typically comprising plastic, and a tongue portion 170 which is inserted into the buckle 162. The buckle 162 has internal elements (not shown) for engaging the tongue portion 170 via an aperture 172 in the tongue portion 170, as well as a PUSH button 173 for releasing the tongue portion 170.

The latch plate 160, in particular the handle portion 168, has a slotted opening 174 through which the webbing 150 slides to define a shoulder belt portion 176 between the relatively upper end 152 and the latch plate 160, and a lap belt portion 178 between the relatively lower end 156 and the latch plate 160.

The shoulder belt portion 176 is shown in solid lines in its repositioned or "adjusted" position due to the repositioning element 142. In addition, the undeflected position that the shoulder belt portion 176 takes in the absence of the repositioning element 142 is shown in phantom lines, and designated 180.

With reference to FIGS. 10–15, the clamping element 140 more particularly includes a back portion 190 and a cover portion 192 positionable on opposite sides of the webbing of the shoulder belt portion 176, generally in the same manner as the clamping element 82 of the positioning device 80 described hereinabove with reference to FIGS. 1–9.

Figure 12:
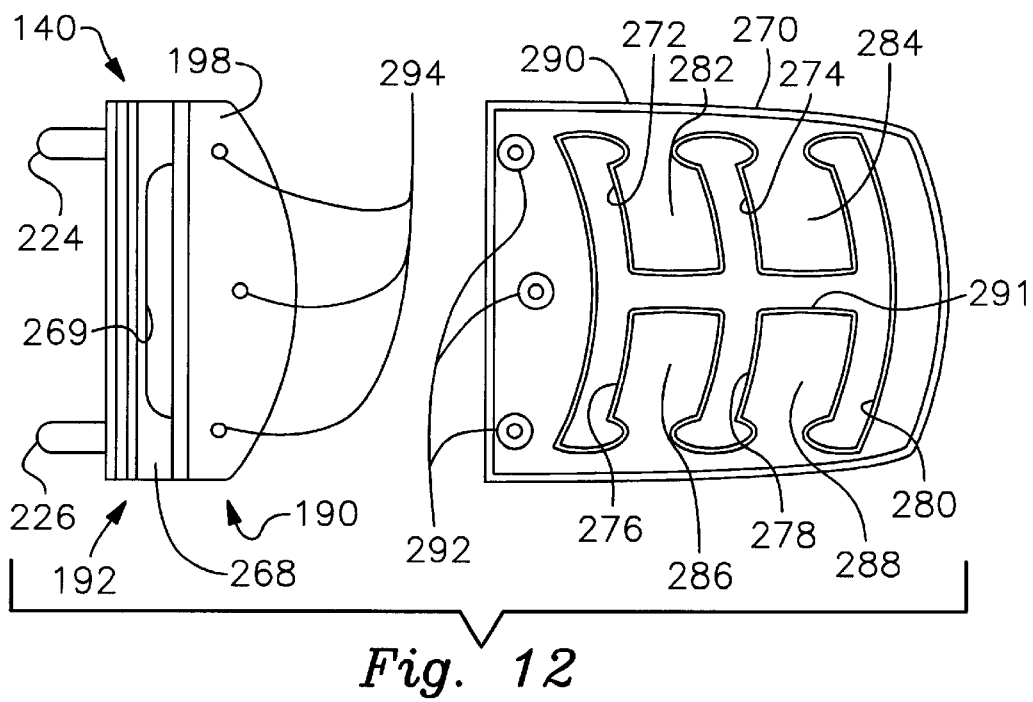
FIG. 12 is an exploded view corresponding to FIG. 11.
Figure 13:
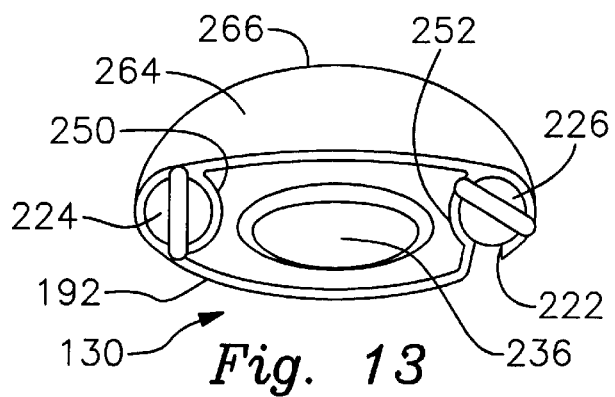
FIG. 13 is a view taken on line 13—13 of FIG. 10.
Figure 14:
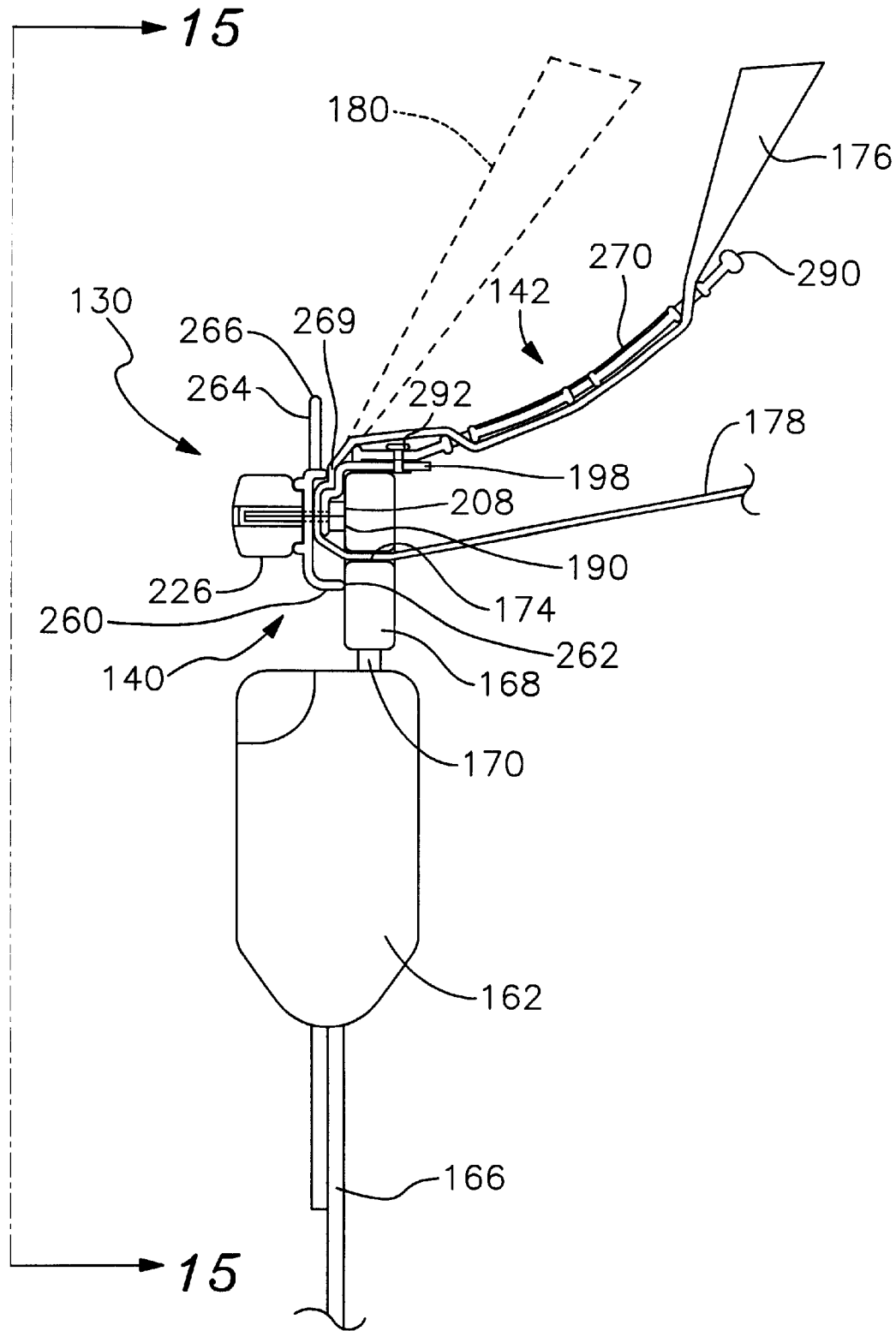
FIG. 14 is an enlarged front view, partly in cross-section, in the same orientation as FIG. 9, showing the positioning device in use.
Figure 15:
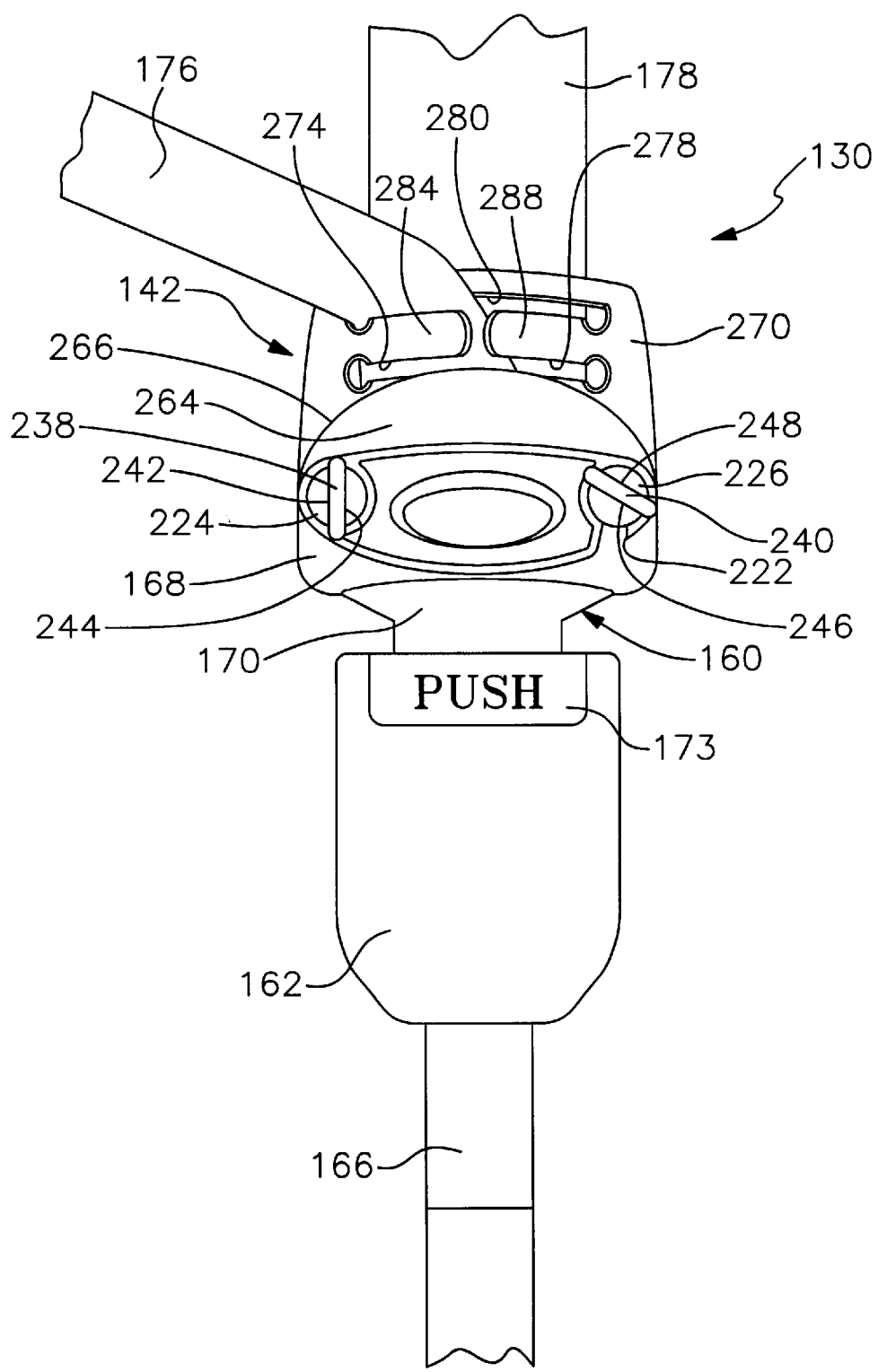
FIG. 15 is a view taken on line 15—15 of FIG. 14.

With particular reference to FIGS. 16–20, in addition to FIGS. 12 and 14, the back portion 190 includes a main body 194, which may be made of high density polyethylene, as well as a metal backing plate 196 for strength. The main body 194 in turn includes a clamp portion 197 and an integral repositioning element attachment portion 198. Attached to and extending from the metal plate 196 are a pair of threaded posts 199 and 200. The metal plate 196 is received within a recess 202 in the backside of the clamp portion 197, and retained via an interference fit with apertures 204 and 206 in the clamp portion 197. A raised ridge 207 at least partially surrounds and defines the recess 202.

The back portion 190 has a rear contact surface 208 which defines a plane of contact with the latch plate 160 in the buckled-up configuration. The rear contact surface 208 may in part be defined by the ridge 207.

Figure 21:
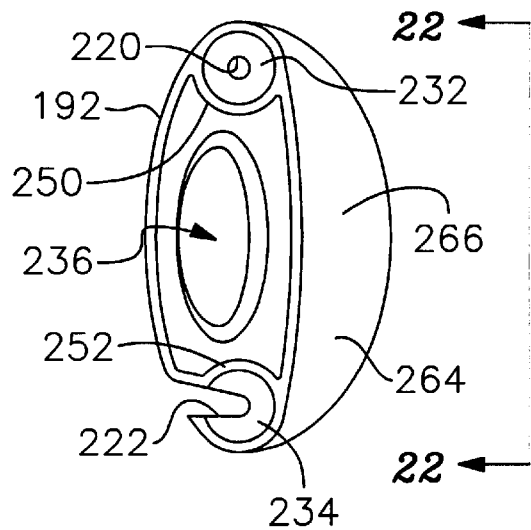
FIG. 21 is a front view, similar to FIG. 13, of the front portion of the clamp element of the positioning device of FIG. 9.
Figure 22:
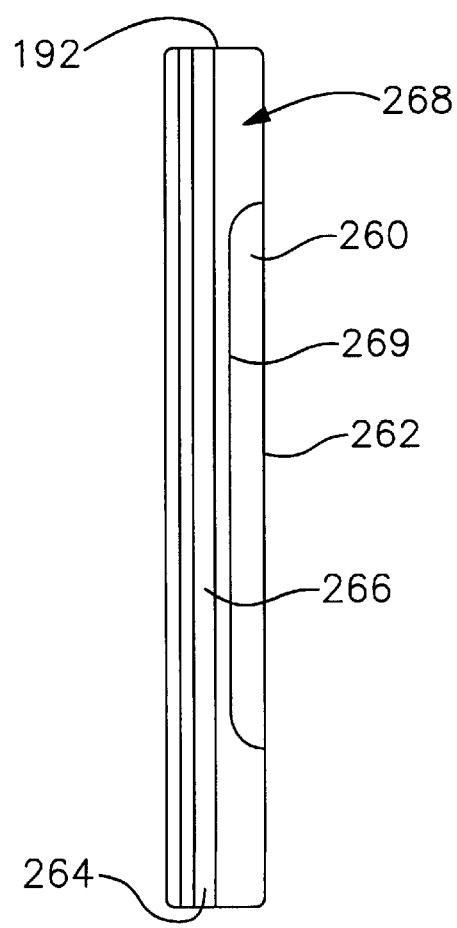
FIG. 22 is a top view of the clamp element front portion, taken on line 22—22 of FIG. 21.

Referring in particular to FIGS. 21 and 22, in addition to FIGS. 12 and 14, the cover portion 192, which may be made of metal, plastic or a combination, includes an aperture 220 through which the threaded post 199 extends. To facilitate installation, as is described hereinbelow with reference to FIG. 23, the cover portion 192 also includes a slot 222 which receives the threaded post 200.

A corresponding pair of knobs 224 and 226 (FIGS. 14 and 15) engage the respective threaded posts 199 and 200 to provide a clamping force. The knobs 224 and 226 have lower surfaces 228 and 230 which bear against corresponding bearing surfaces 232 and 234 in the generally visible surface 236 of cover portion 192. To aid in gripping, the knobs 224 and 226 have respective wing elements 238 and 240. There are gripping surfaces 242 and 244 on opposite sides of the wing element 238, and gripping surfaces 246 and 248 on opposite sides of the wing element 240.

To aid in retention, when knobs 224 and 226 are partially loosened, the bearing surfaces 232 and 234 are generally encircled by raised ridges 250 and 252, except where the ridge 252 is interrupted by the slot 222.

With particular reference to FIG. 14, attached to the clamping element 140, and in particular to the cover portion 192, is an outrigger element 260 formed so as to extend generally downwardly in the buckled-up configuration past the slotted opening 174, and to bear against the latch plate 160 for preventing rotation of the clamping element 140 towards the slotted opening 174, as force is applied to the lap belt portion 178. The rotation-preventing function of the outrigger element 260 is particularly important in maintaining the orientation of the shoulder belt repositioning element 142 during use, and also aids in maintaining the threaded knobs 224 and 226 in an accessible position.

In the positioning device embodiment 130 of FIGS. 9–26, the outrigger element 260 extends to a distal end 262 which is generally within an extension of the plane of contact defined by the rear contact surface 208 of the back portion 190, which bears against the latch plate 160. To facilitate insertion of the tongue portion 170 of the latch plate 160 into the buckle 162 when the positioning device 130 is installed, a hand-engaging element 264 is integrally attached to the cover portion 192, and extends generally upwardly in the buckled-up configuration. The hand-engaging element 264 comprises a curved flange-like structure 264 with a beaded edge 266. In the top view of FIG. 22, just inboard of the hand-engaging element 264 is an upper surface 268 into which a wide notch 269 is formed to provide clearance for the webbing of the shoulder belt portion 176, as well as to provide a visual indication of the correct manner of assembly to the shoulder belt portion 176.

The outrigger element 260 serves a number of functions. Thus, the outrigger element 260 helps position the latch plate 160 vertically for easier insertion into the buckle 162. In addition, the outrigger element 260 keeps the top plane of the cover portion 192 horizontal, to allow hand force to be applied along the vertical axis of the latch plate 160 during insertion into the buckle 162. By holding the top plane of the cover portion 192 horizontal, the outrigger element 260 helps position the shoulder belt repositioning element 142, described in greater detail hereinbelow with reference to FIGS. 11, 12, 14 and 25, to keep the shoulder belt repositioning element 142 under tension as the repositioning element 142 flexes against the user as needed to keep the shoulder belt portion 176 in the optimum position for comfort and safety. The outrigger element 260 in addition helps balance the insertion forces applied to the hand-engaging element 264 by the hand of the user.

Figure 11:
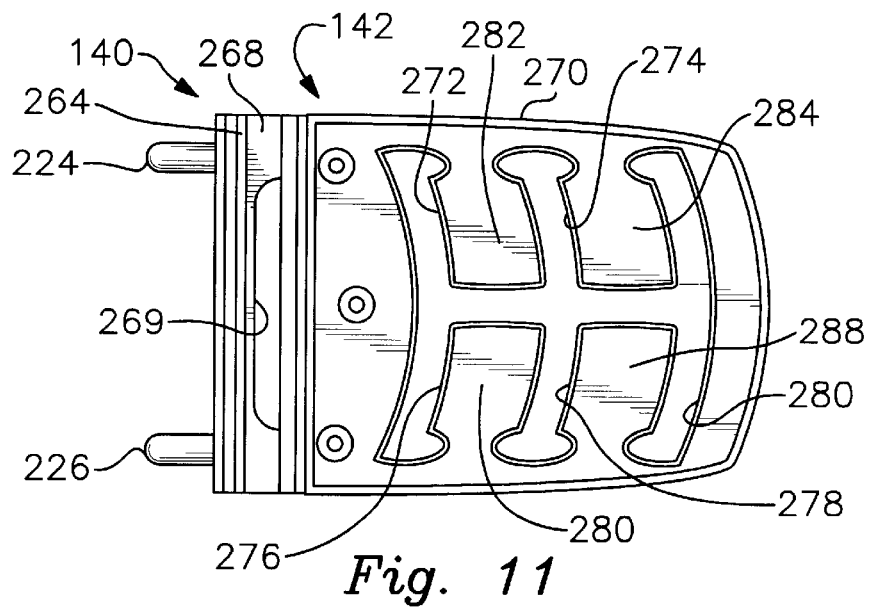
FIG. 11 is a plan view taken on line 11—11 of FIG. 10.

With reference to FIGS. 11 and 12, the shoulder belt repositioning element 142 more particularly takes the form of a flexible plate-like element 270 having slots 272, 274, 276, 278 and 280 which define flexible fingers 282, 284, 286 and 288 for holding the shoulder belt portion 176 in a deflected position. The flexible plate-like element may be made of a material such as high density polyethylene. There is a rounded bead 290 on the periphery of the repositioning element 270, as well as a rounded bead 291 on inside edges defining the slots 272, 274, 276, 278 and 280.

The plate-like repositioning element 270 is secured to a main body 194 of the back portion 190 by means of suitable fasteners such as rivets 292, which cooperate with apertures 294 formed in the repositioning element attachment portion 198 of the main body 194 of the back portion 190. As may particularly be seen in FIG. 10, prior to installation and use the flexible plate-like element 270 extends generally perpendicular to the plane of contact defined by the rear contact surface 208 of the back portion 190, and maintained by the outrigger element 260. However, during use, the flexible plate-like repositioning element 270 assumes various deflected positions as may be seen, for example, in FIGS. 9 and 14.

The operation of the clamping element portion 142 of the positioning device 130 of FIGS. 9–26 is generally the same as the operation of the clamping element 82 of the positioning device 80 described hereinabove with reference to FIGS. 1–8, with the addition of functions served by the outrigger element 260 and the hand-engaging element 264.

Figure 23:
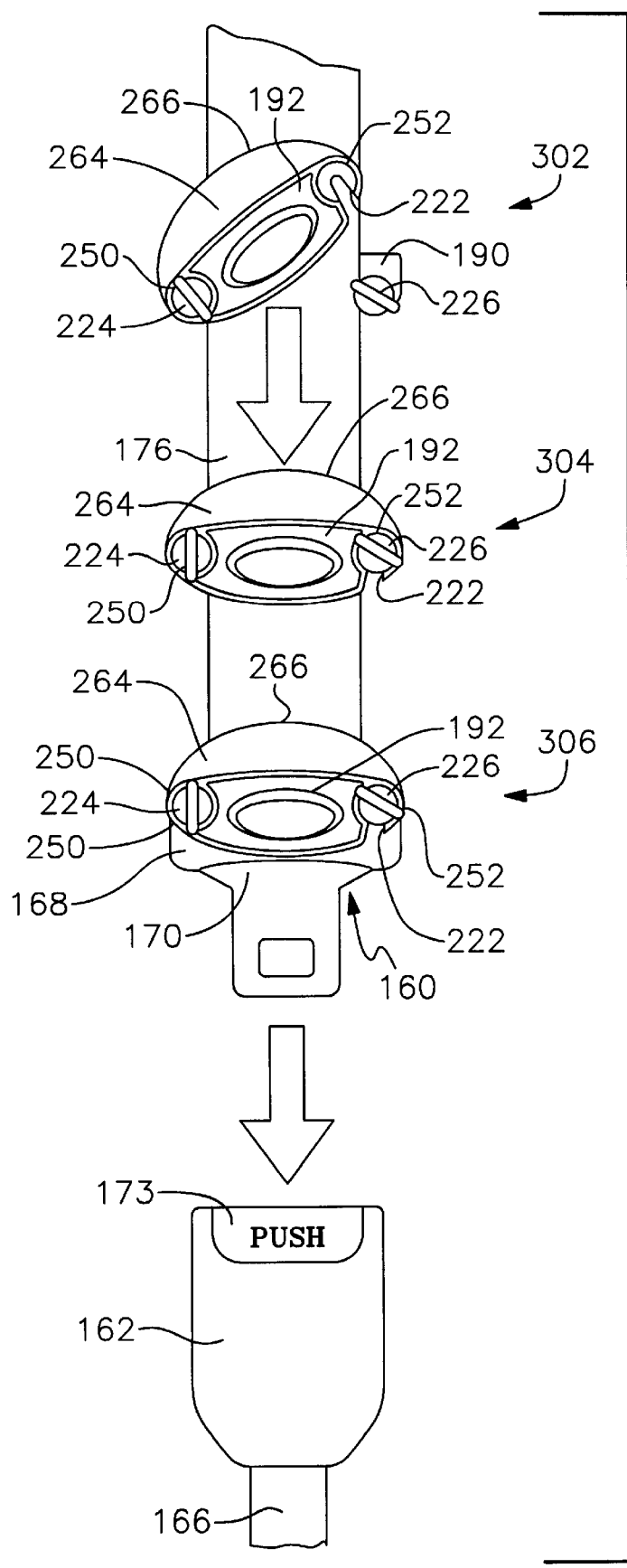
FIG. 23 represents an installation sequence of the positioning device of FIG. 9.

In addition, and with particular reference to FIG. 23, the slot 222 in the cover portion 192, and the ridges 250 and 252, provide additional advantages during installation. FIG. 23 shows the same positioning device 130 at three different positions 302, 304 and 306, during an installation sequence. Thus, at position 302, the threaded knob 224 is slightly loosened so that the cover portion 192 can pivot with reference to the back portion 190, while keeping the two portions 190 and 192 together. The knob 226 is loosened sufficiently so that the knob 226 entirely clears the ridge 252, allowing the cover portion 192 to pivot away from the back portion 192 so that the positioning device 130 can be installed on the webbing of the shoulder belt portion 176.

At position 304, the cover portion 192 has been pivoted back into operational position with reference to the back portion 190, but the knobs 224 and 226 are still loose such that the positioning device 130 is free to slide along the webbing of the shoulder belt portion 176. The knob 226 is screwed down sufficiently so that the knob 226 engages with the ridge 252 generally surrounding the circular bearing surface 234, but without providing undue clamping force.

Finally, as depicted in the position 306 of FIG. 23, the positioning device 130 is slid to its in-use position, and installed as described hereinabove with reference to FIG. 6.

Figure 24:
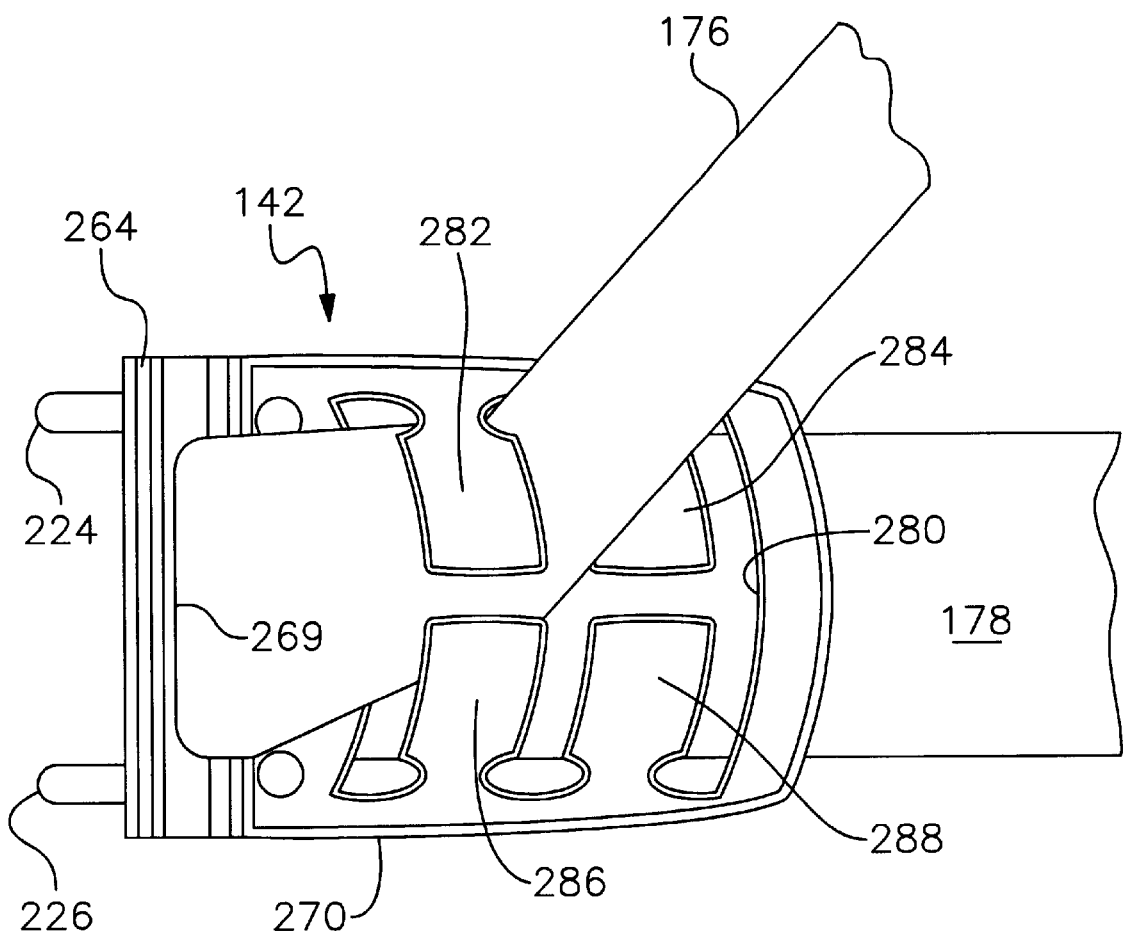
FIG. 24, which is in the same orientation as FIG. 11, depicts the shoulder belt being held in one possible position.
Figure 25:
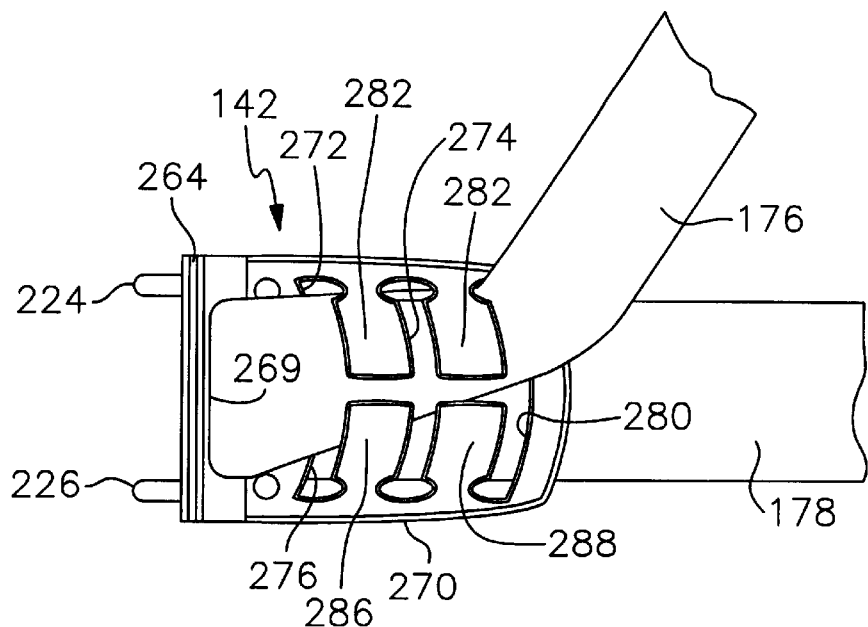
FIG. 25, which is also in the same orientation as FIG. 11, depicts the shoulder belt being held in another possible position.

Once the positioning device 130 is secured and holding the tension on the lap belt portion 178 so as to maintain the lap belt portion 178 in the correct "snug" position as described hereinabove, the shoulder belt portion 176 is placed under the fingers 282 and 284 of the repositioning element 270, as may be seen in FIGS. 24 and 25, to achieve proper "adjustment" or repositioning of the shoulder belt portion 176. In FIGS. 24 and 25, the shoulder belt portion 176 is shown under the finger 282 or under the fingers 282 and 284. However, when used on the opposite side of the seat, the plate-like repositioning element 270 would be reversed with reference to the positioning shown in FIGS. 24 and 25, and the shoulder belt portion 176 would be under the finger 286, or the fingers 286 and 288.

Thus, the positioning device 130 can be used with seat belt assemblies 148 on either the left or right side of the vehicle.

With particular reference to FIG. 9, the diagonally-extending shoulder belt portion 176 is thus repositioned from its un-deflected position shown in phantom as 180 to the repositioned position designated with reference number 176. This improves the comfort by moving the diagonally-extending shoulder belt 176 off the neck of the user, while still routing the shoulder belt portion 176 across the mid point between the neck and shoulder, that is, to a position over the clavicle midway between the sterno-clavicular joint and the shoulder joint. In addition, the shoulder belt portion 176 crosses more nearly over the sternum.

In the event of a collision, the fingers 282 and 284 flex, and allow the shoulder belt portion 176 to release from the repositioning element 270 as the torso moves forward. The fingers 282 and 284 thus release the shoulder belt portion 176, allowing both the shoulder belt portion 176 and the lap belt portion 178 to function as originally designed by the automobile manufacturer.

Figure 26:
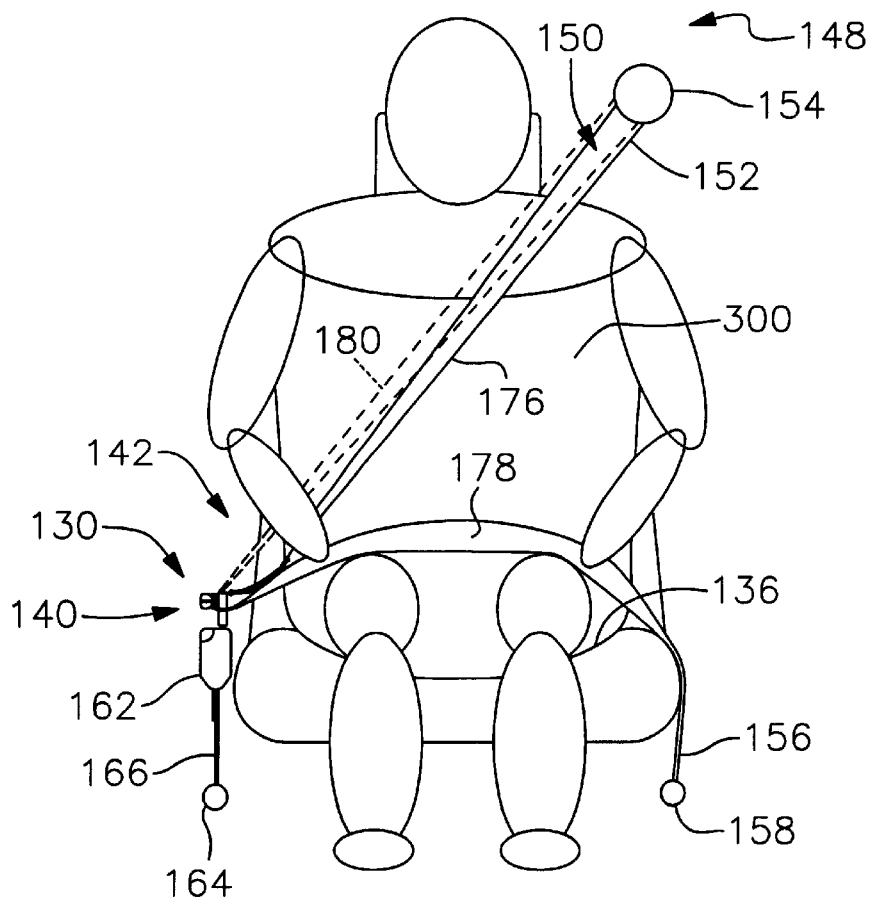
FIG. 26 is a front elevational view, comparable to FIG. 9, showing the same positioning device in use in a buckled-up condition with an adult larger than the child of FIG. 9.

With reference to FIG. 26, depicted is the manner in which the positioning device 160 self-adjusts for less deflection of the diagonally-extending shoulder belt portion 176 when used with an adult 300. Thus, due to the greater incident angle of the lap belt portion 178 in view of the taller and wider lap of the adult user 300, the plate-like repositioning element 270 serving as the shoulder belt repositioning element 142 is flexed towards a position more in line with the undeflected position 180 of the shoulder belt portion 176.

Figure 27:
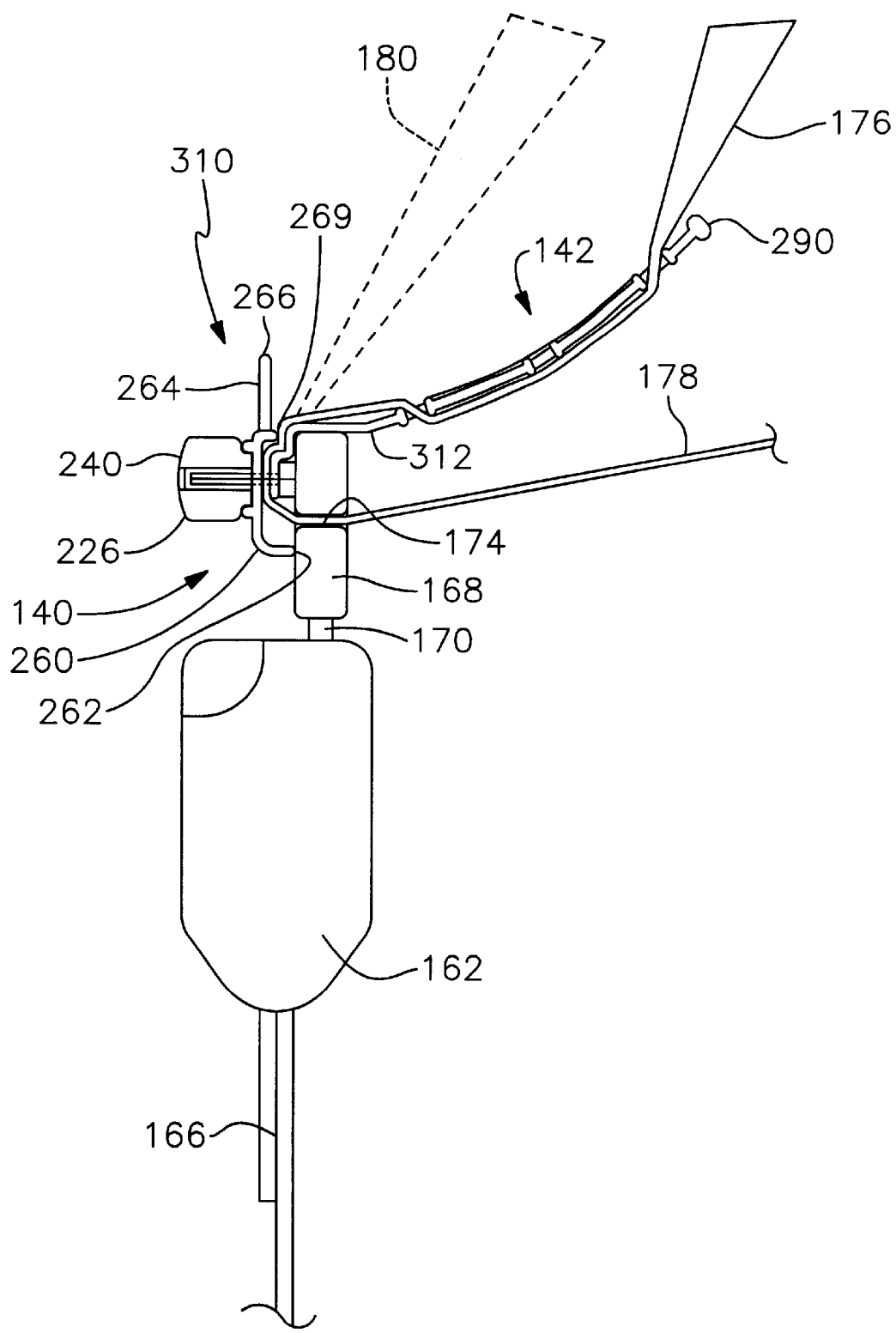
FIG. 27 is a cross-sectional view showing a portion of a positioning device embodying the invention, differing from FIG. 14 in that the clamp element rear portion and the shoulder belt repositioning element are of a one-piece construction.

With reference now to FIG. 27, depicted is another positioning device 310 embodying the invention, differing from the positioning device 130 of FIGS. 9–26 in that the main body 194 of the back portion 190 and the plate-like repositioning element 270 of FIGS. 16–22 are of one-piece construction, as a single element 312. A suitable material is high density polyethylene. Thus, the rivets 292 of the positioning device embodiment 130 are eliminated, as well as the repositioning element attachment portion 198. Stated in another way, in the positioning device embodiment 310 of FIG. 14 the attachment portion 198 of the embodiment 130 is itself extended to serve as the shoulder belt repositioning element 142.

In all other respects, the positioning device 310 functions in the same manner as the positioning device 130 of FIGS. 9–26.

Figure 28:
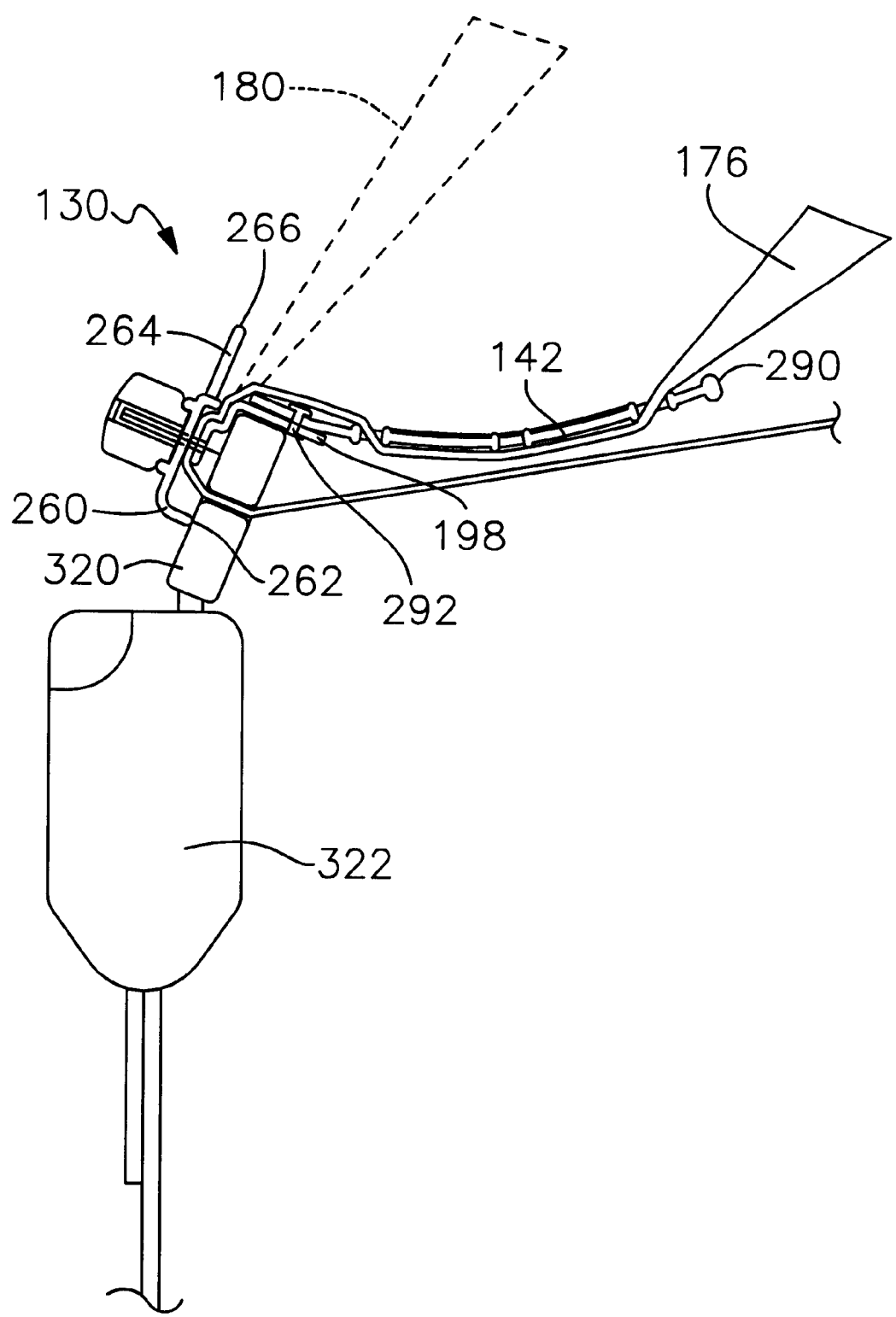
FIG. 28, which may be compared to FIG. 14, shows the positioning device of FIG. 9 in use in conjunction with another form of automobile seat belt buckle and latch plate combination.
Figure 29:
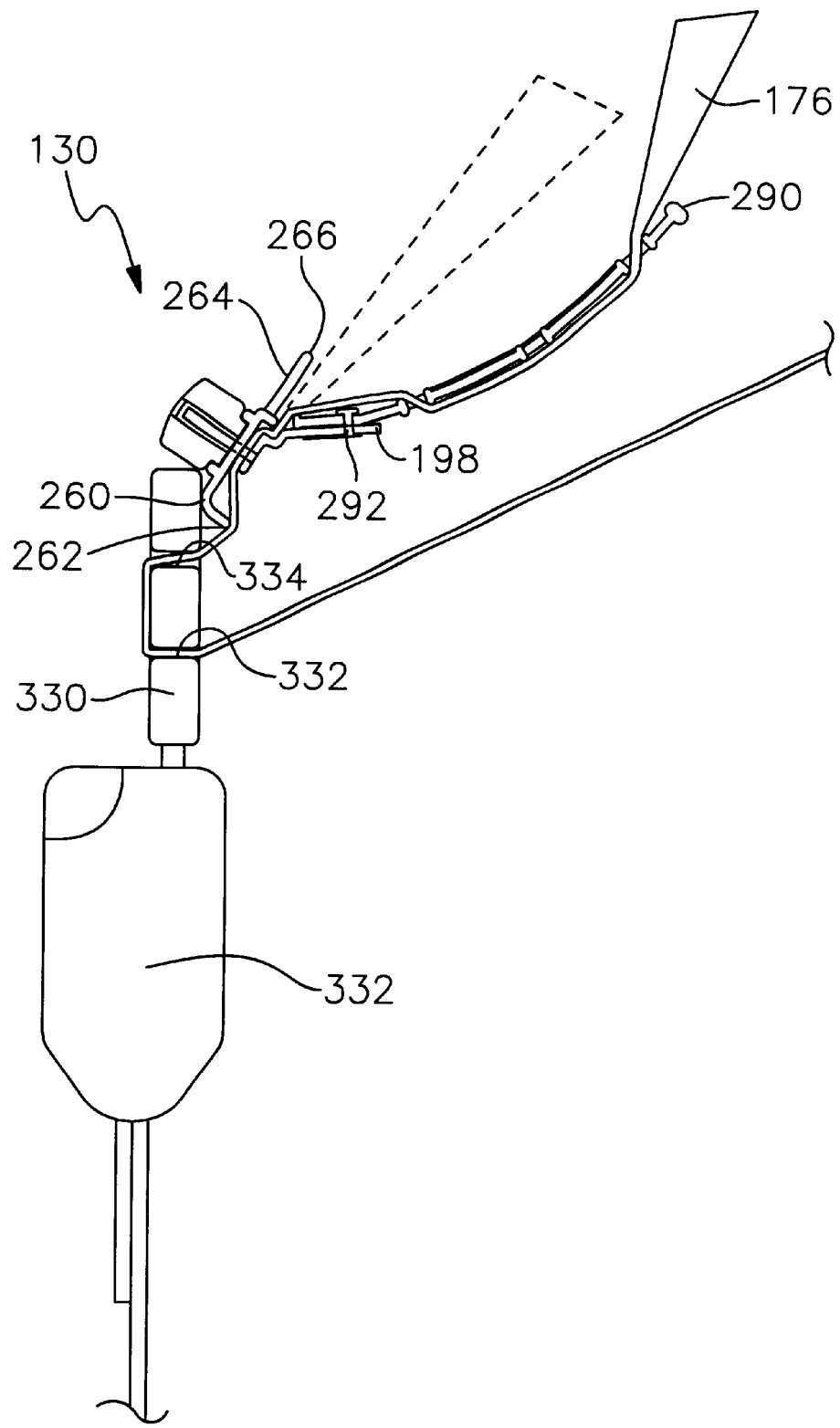
FIG. 29, which also may be compared to FIG. 14, shows the positioning device of FIG. 9 in use in conjunction with yet another form of automobile seat belt buckle and latch plate combination.
Figure 30:
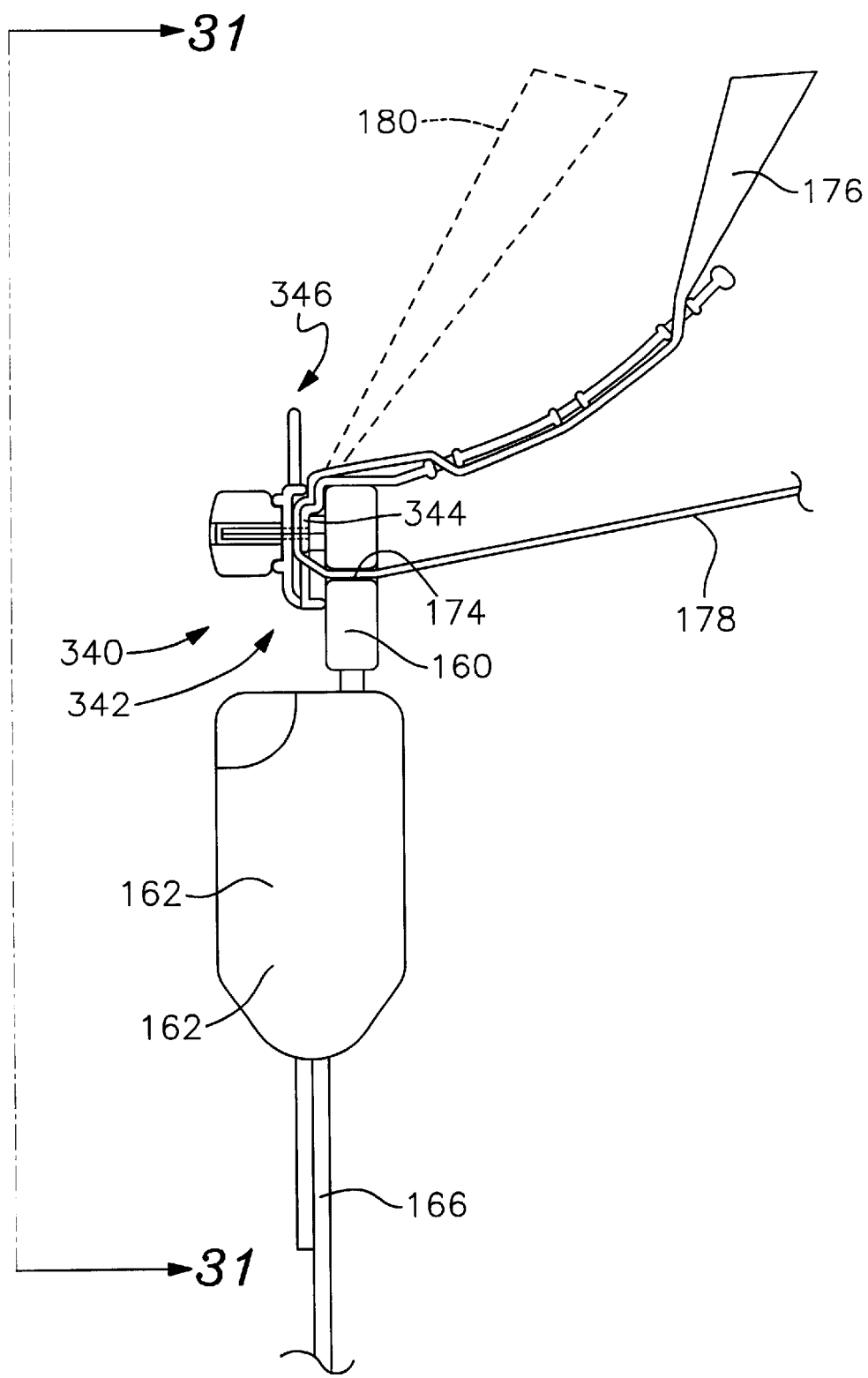
FIG. 30, which may be contrasted with FIG. 14, is a view partly in cross-section of a positioning device embodying the invention with an alternative form of outrigger.
Figure 31:
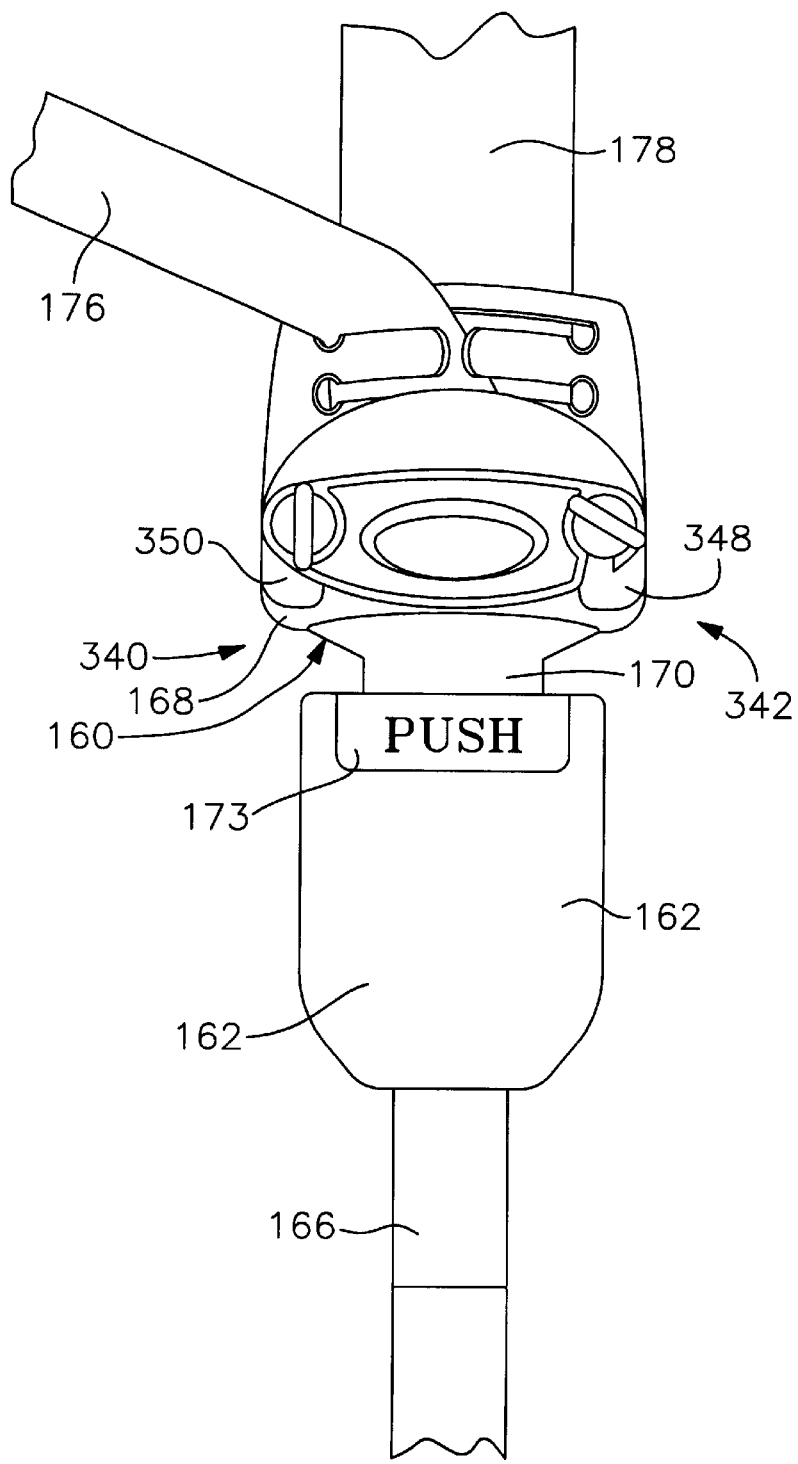
FIG. 31, which may be contrasted with FIG. 15, is a view taken on line 31—31 of FIG. 30.
Figure 32:
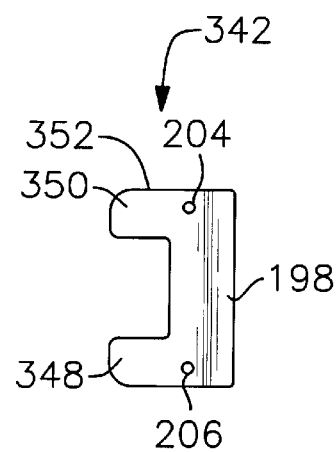
FIG. 32, which shows a modification of FIG. 17, is a front view showing the web-facing surface of the clamp element back portion of the device of FIG. 30.
Figure 33:
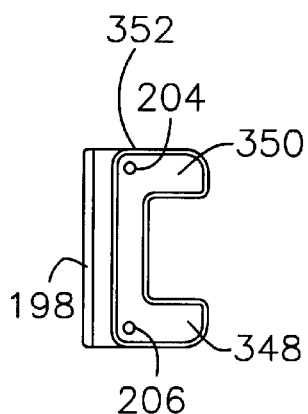
FIG. 33 is a back side view of the FIG. 32 clamp element back portion.
Figure 34:
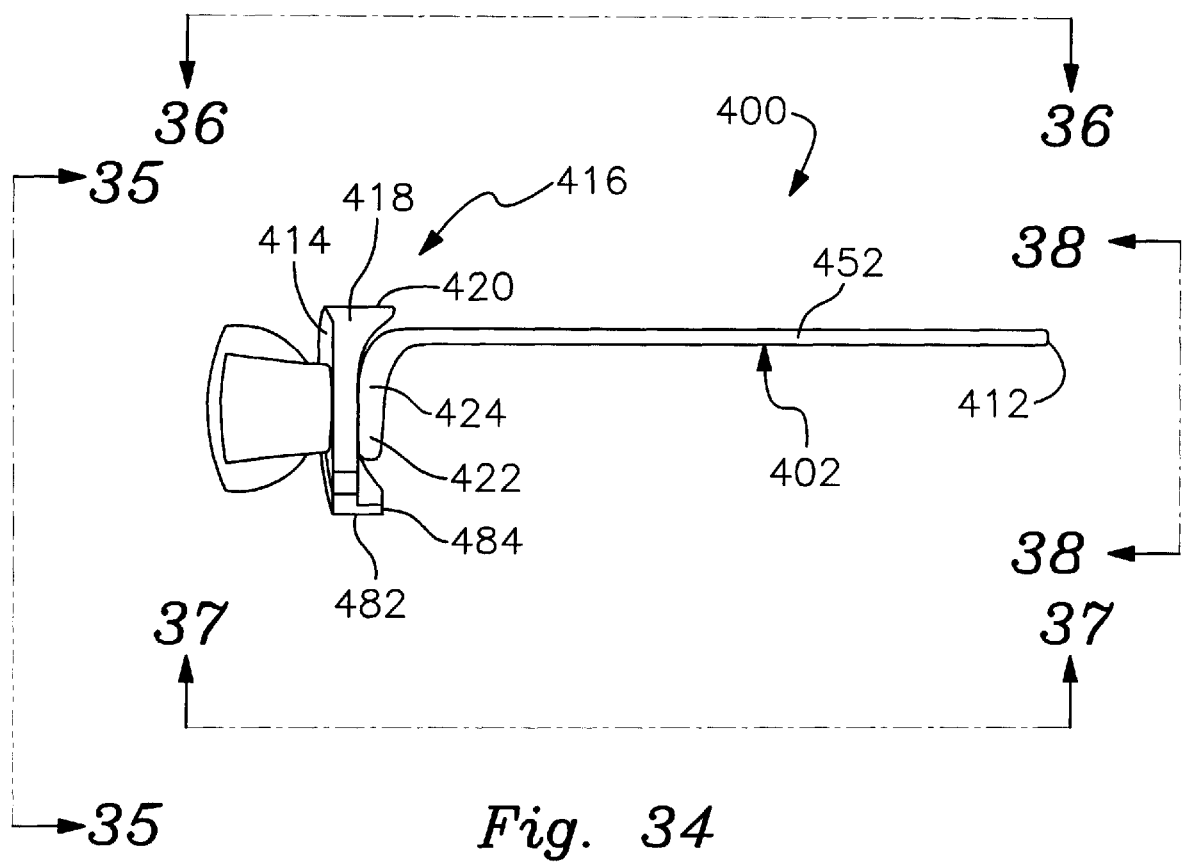
FIG. 34 is a side elevational view of yet another positioning device embodiment, prior to installation and use.
Figure 35:
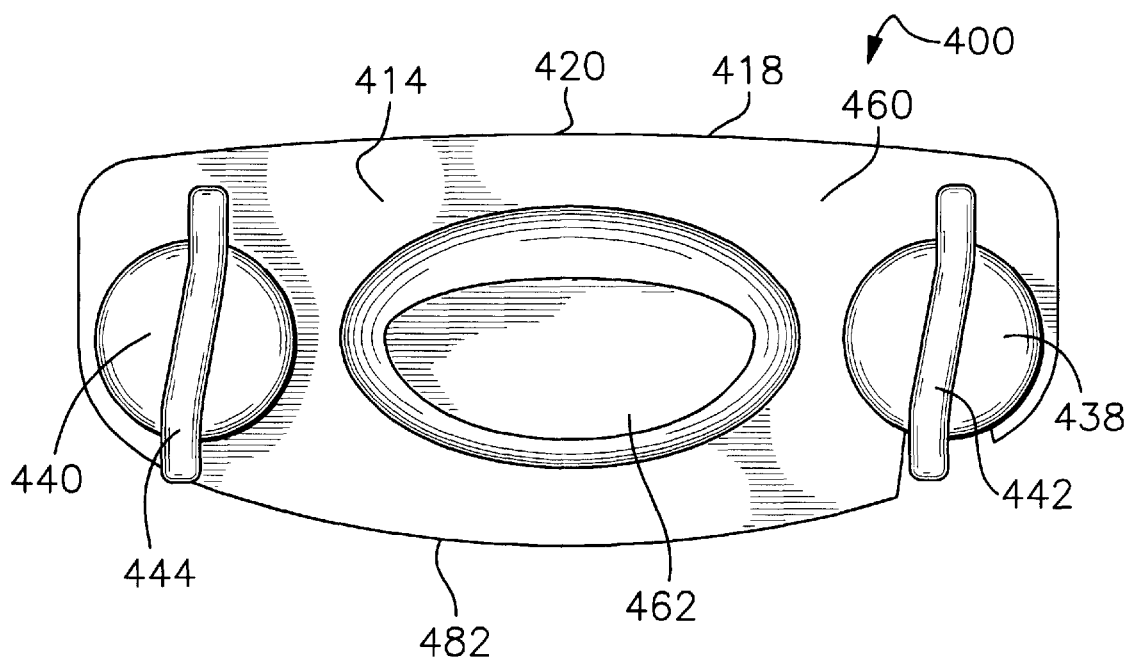
FIG. 35 is an elevational view taken on line 35—35 of FIG. 34.
Figure 36:
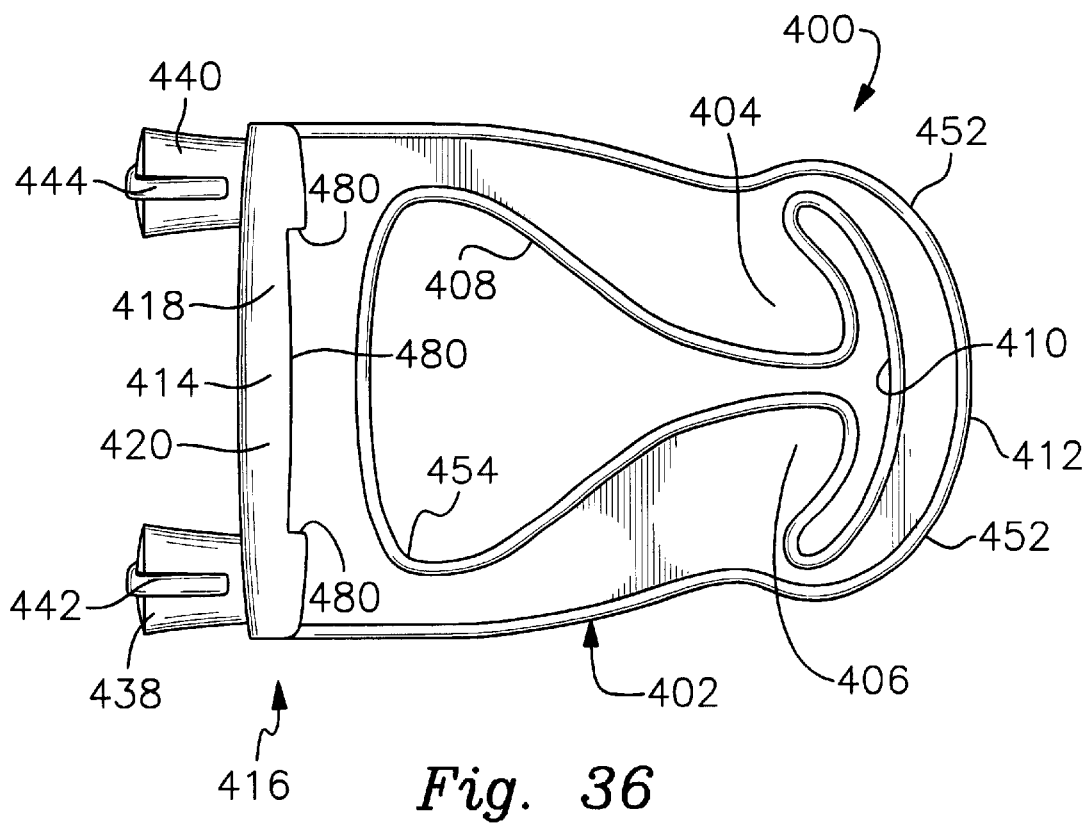
FIG. 36 is a top view taken on line 36—36 of FIG. 34.
Figure 37:
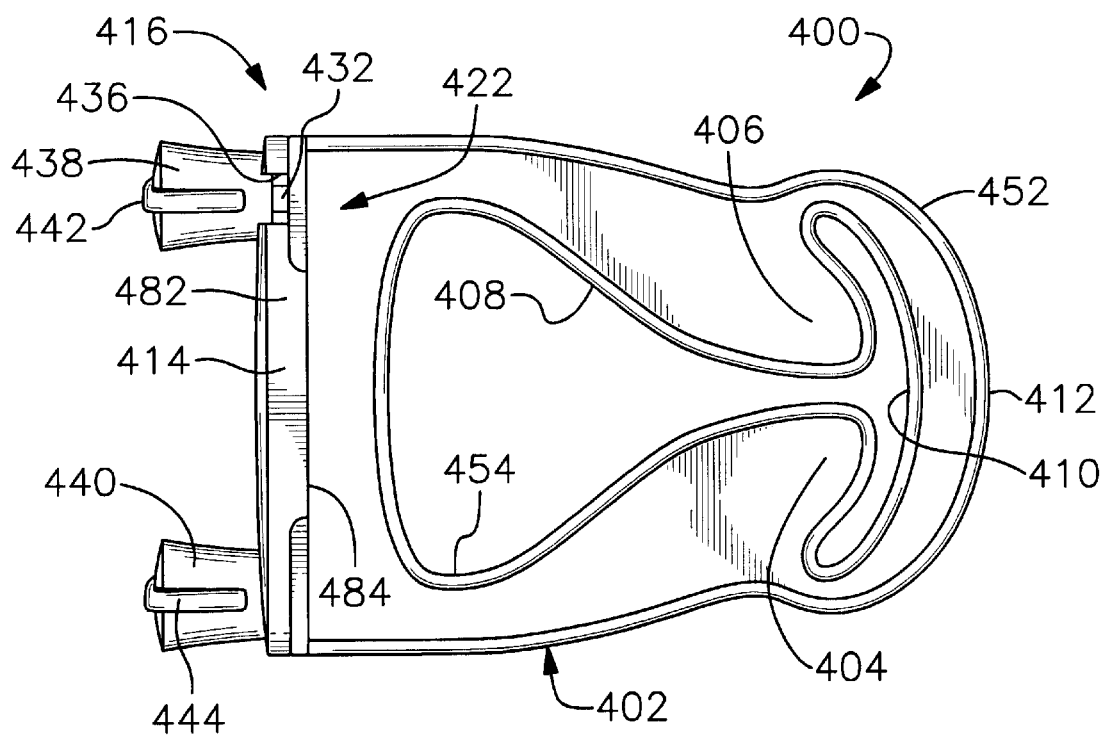
FIG. 37 is a bottom view taken on line 37—37 of FIG. 34.

With reference to FIGS. 28 and 29, in addition to FIG. 14, the positioning device 130 of FIGS. 9–25 (or the positioning device 310 of FIG. 27), can be employed in combination with several different types of latch plate and buckle combinations.

Thus, FIG. 14, for purposes of comparison, shows the positioning device 130 in use in conjunction with the latch plate 160 and buckle 162 combination as described hereinabove with reference to FIGS. 9–26. This is a common configuration.

FIG. 28 depicts the same repositioning device 130 used in conjunction with an angled latch plate 320 and buckle 322 assembly. The functionality is essentially the same; additional flexing of the shoulder belt repositioning element 142 may be required.

FIG. 29 depicts use of the positioning device 130 in conjunction with a latch plate 330 and buckle 332 assembly of the type wherein the latch plate 330 has a pair of slots 332 and 334 through which the webbing of the shoulder belt portion 176 passes. In this case, the repositioning device 130 is installed so that it bears generally against the back side of the latch plate 330 adjacent to the upper slot 334, while clamped on the shoulder belt portion 176. Although some of the functionality of the outrigger element 260 is lost in this configuration, many of the advantages of the positioning device 130 are retained.

With reference to FIGS. 30–33, shown is an alternative positioning device 340 embodiment, differing from the positioning device 130 (FIGS. 9–26) and the positioning device 310 (FIG. 27) in that in the positioning device 340 of FIGS. 30–33 an outrigger element, generally designated 342, is attached to a back portion 344 of a clamp element 346. More particularly, the outrigger 342 comprises a pair of tab-like extensions 348 and 350 of a main body 352 of the back portion 344, corresponding to the main body 194 of the back portion 190 of the positioning device 130 embodiment. Thus, FIG. 32 corresponds to FIG. 17 described hereinabove, and FIG. 33 corresponds to FIG. 18 hereinabove. The metal back plate 196 of FIGS. 19 and 20 with its threaded posts 199 and 200 is employed in conjunction with the main body 352 of FIGS. 32 and 33 in the same manner as with the main body 194 of FIGS. 17 and 18.

The tab-like extensions 348 and 350 are configured so as to extend at opposite ends of the slotted opening 174 past the slotted opening 174 in the buckled-up configuration generally downwardly so as to bear against the latch plate 160 for preventing rotation of the clamping element 346 towards the slotted opening 174.

Finally, FIGS. 34–40 show yet another positioning device 400 embodiment. The positioning device 400 differs from the positioning device 130 embodiment of FIGS. 9–25 primarily in two respects. First, a plate-like shoulder belt portion 176 repositioning element 402 of high density polyethylene, corresponding to the plate-like repositioning element 270 of the positioning device 130 embodiment, has a pair of flexible fingers 404 and 406 which differ somewhat in configuration from the fingers 282, 284, 286 and 288 (FIGS. 11, 12, 24 and 25) of the positioning device 130 embodiment, with a single large opening 408 replacing the slots 272, 274, 276 and 278 of the positioning device 130 embodiment. A slot 410 near the far end 412 corresponds to the slot 280 of the positioning device 130 embodiment. The opening 408 facilitates access by the hand of the user to the latch plate 160 and buckle 162 during installation. Second, a cover portion 414 of a clamping element 416, corresponding to the cover portion 192 of the clamping element 140 of the positioning device 130 embodiment, includes a hand-engaging element 418 that has a relatively flat upper surface 420 compared to the beaded edge 266 of the flange-like structure 264 comprising the hand-engaging element 264 of the positioning device 130 embodiment.

Figure 38:
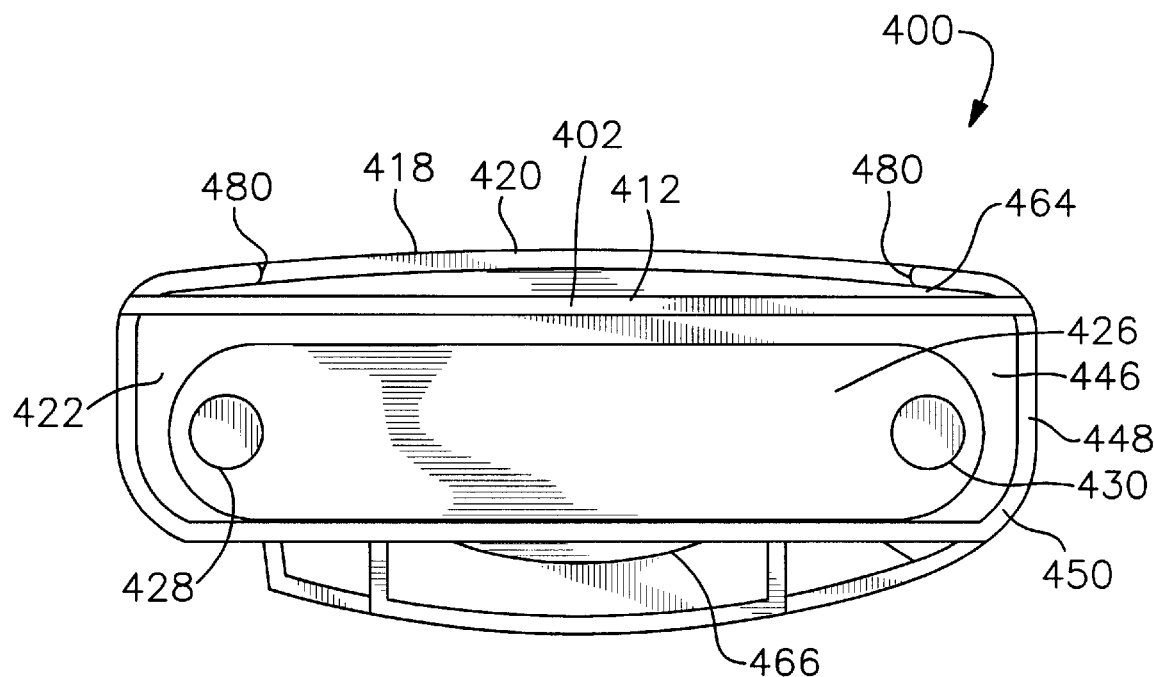
FIG. 38 is a view taken on line 38—38 of FIG. 34.
Figure 39:
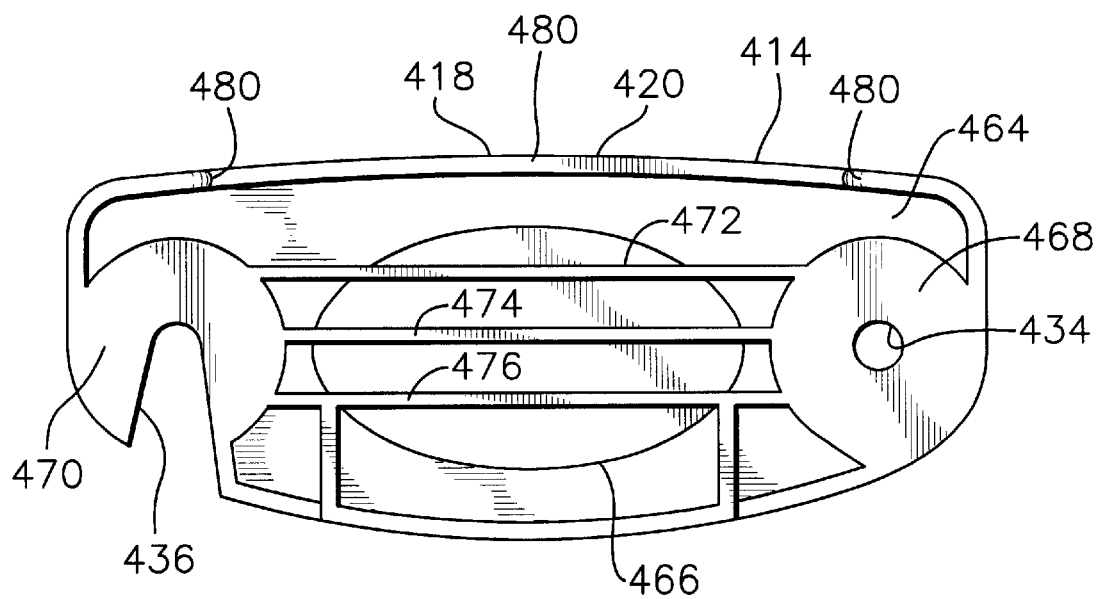
FIG. 39 is a view in the same orientation as FIG. 38, but showing the rear surface of the clamping element cover portion of the positioning device embodiment of FIG. 34.
Figure 40:
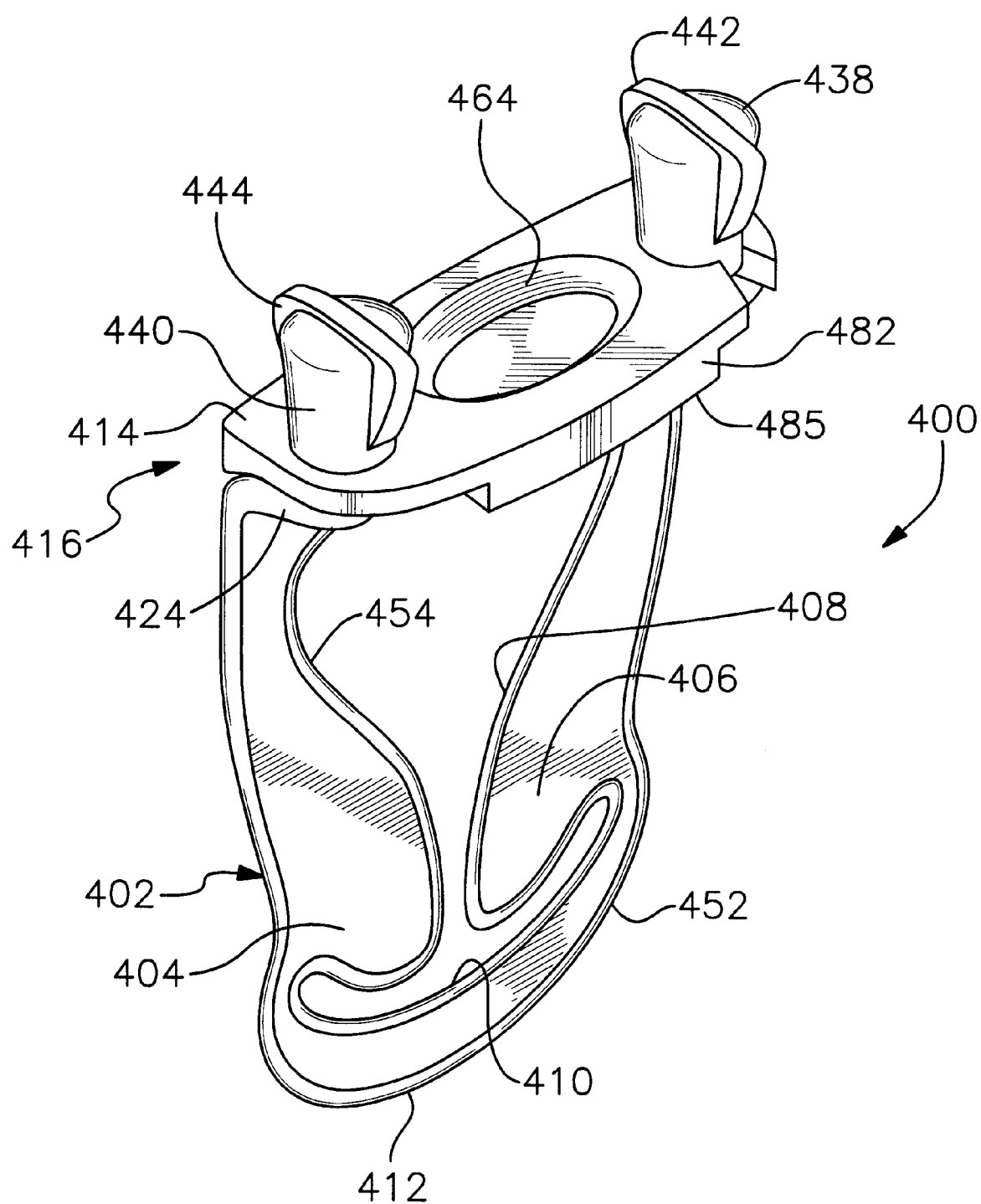
FIG. 40 is a three dimensional view of the positioning device embodiment of FIG. 34.

In the positioning device embodiment 400 of FIGS. 34–40, the clamping element 416 has a back portion 422, corresponding to the back portion 190 of the clamping element 140 of the positioning device 130 embodiment, including a main body 424 of high density polyethylene integral with the repositioning element 402, as well as a metal backing plate 426 (FIG. 38). The metal backing plate 426 is identical to the metal backing plate 196 (FIGS. 19 and 20) of the positioning device 130 embodiment, and includes two threaded posts or studs like the threaded posts 199 and 200 (FIGS. 19 and 20). Recessed heads 428 and 430 of these two threaded posts or studs are visible in FIG. 38, and a portion of one of the posts or studs 432 is visible in the underside view of FIG. 37. The two threaded slots or studs extend respectively through an aperture 434 and a slot 436 in the cover portion 414 (corresponding to the aperture 220 and slot 222 of the cover portion 192 of the positioning device 130 embodiment), and engage a pair of threaded knobs 438 and 440 to provide clamping force. The threaded knobs 438 and 440 have respective wing elements 442 and 444 for gripping.

The main body 424 of the back portion 422 has a recessed rear surface 446 against which the metal backing plate 426 presses, surrounded by a lip 448 having a rounded edge 450. The lip 448 and the metal backing plate 426 together define a rear contract surface of the back portion 422. The integral repositioning element 402 has a rounded bead 452 on its periphery, as well as a rounded bead 454 on inside edges defining the opening 408 and slot 410.

The cover portion 414 has a generally visible surface 460 including an ornamental recess feature 462, and an opposed rear surface 464 (FIG. 39) which is generally hidden during use, including a raised area 466 opposite the ornamental recess feature 462.

The rear surface 464 includes a pair of raised flat areas 468 and 470 respectively surrounding the aperture 434 and slot 436 and serving as bearing surfaces, as well as a set of stiffening ribs 472, 474 and 476 extending between and coplanar with the flat areas 468 and 470.

Formed in the upper surface 420 is a wide notch 480 to provide clearance for the webbing of the shoulder belt portion 196, as well as to provide a visual indication of the correct manner of assembly to the shoulder belt portion 196.

Also attached to the clamping element 416, and in particular to the cover portion 414, is an outrigger element 482 formed so as to extend generally downwardly in the buckled-up configuration past the slotted opening 174, and to bear against the latch plate 160 for preventing rotation of the clamping element 416 towards the slotted opening 174, as force is applied to the lap belt portion 178. The rotation-preventing function of the outrigger element 482 is particularly important in maintaining the orientation of the shoulder belt repositioning element 400 during use, and also aids in maintaining the threaded knobs 438 and 440 in an accessible position.

In the positioning device embodiment 400 of FIGS. 34–40, the outrigger element 482 extends to a distal end 484 which is generally within an extension of the plane of contact defined by the metal backing plate 426 and the lip 448 of the back portion 422, which bears against the latch plate 160. The hand-engaging element 418 facilitates insertation of the tongue portion 170 of the latch plate 160 into the buckle 162 when the positioning device 400 is installed, aided by the single large opening 408 in the repositioning element 402 which facilitates access by the hand of the user to the latch plate 160 and buckle 162.

As in the embodiment described hereinabove, the outrigger element 482 serves a number of functions. Thus, the outrigger element 482 helps position the latch plate 160 vertically for easier insertion into the buckle 162. In addition, the outrigger element 480 keeps the upper surface 420 of the hand-engaging element 418 of the cover portion 414 horizontal, to allow hand force to be applied along the vertical axis of the latch plate 160 during insertion into the buckle 162. By holding the top plane of the cover portion 192 horizontal, the outrigger element 260 helps position the shoulder belt repositioning element 402, so as to keep the shoulder belt repositioning element 402 under tension as the repositioning element 402 flexes against the user as needed to keep the shoulder belt portion 176 in the optimum position for comfort and safety. The outrigger element 480 in addition helps balance the insertion forces applied to the hand-engaging element 418 by the hand of the user.

The positioning device 400 of FIGS. 34–40 functions in the same manner as the positioning device 130 embodiment of FIGS. 9–25, as is generally described hereinabove with reference to FIGS. 9 and 26.

While specific embodiments of the invention have been illustrated and described herein, it is realized that numerous modifications and changes will occur to those skilled in the art. It is therefore to be understood that the appended claims are intended to cover all such modifications and changes that fall within the true spirit and scope of the invention.

What is claimed is:

1. A positioning device for use in combination with a vehicle seat belt assembly including webbing connected to a retraction device and extending at a relatively upper end from a force diverter and secured at a relatively lower end to an anchor, and including a latch plate insertable into a buckle and having an opening through which the webbing slides to define a shoulder belt portion between the relatively upper end and the latch plate, and a lap belt portion between the relatively lower end and the latch plate, said positioning device comprising:

a clamping element frictionally engagable with the shoulder belt portion and positionable immediately adjacent the latch plate so as to maintain the lap belt portion in a desired snug condition when the latch plate is inserted into the buckle by preventing sliding of the webbing through the opening in a direction which would loosen the lap belt portion, while permitting sliding of the webbing through the opening in a direction which would further tighten the lap belt portion.

2. The positioning device of claim 1, wherein said clamping element comprises:

a back portion and a cover portion positionable on opposite sides of the webbing; and at least one adjustable tightening device connected to said back portion and to said cover portion for developing a clamping force between said back portion and said cover portion.

3. The positioning device of claim 2, wherein said at least one adjustable tightening device comprises a threaded post extending from said back portion through an aperture in said cover portion, and a threaded knob on a projecting end of said threaded post.

4. The positioning device of claim 2, which further comprises a hand-engaging element attached to said cover portion and extending generally upwardly in a buckled-up configuration to aid in inserting the latch plate into the buckle.

5. The positioning device of claim 1, which further comprises a shoulder belt repositioning element attached to said clamping element.

6. The positioning device of claim 5, wherein said shoulder belt repositioning element comprises a plate-like element having at least one opening defining fingers for holding the shoulder belt portion.

7. The positioning device of claim 6, wherein said at least one opening comprises slots in said plate-like element defining a plurality of fingers for adjustably holding the shoulder belt portion in a selected one of a plurality of deflected positions.

8. The positioning device of claim 6, wherein said plate like element is flexible.

9. The positioning device of claim 5, wherein said shoulder belt repositioning element is flexible.

10. The positioning device of claim 1, wherein:

said clamping element includes a back portion and a cover portion positionable on opposite sides of the webbing, the back portion having at least one rear contact surface defining a plane of contact with the latch plate in a buckled-up configuration, and which positioning device further comprises:

a shoulder belt repositioning element in the form of a plate-like element extending generally perpendicularly to the plane of contact and having at least one opening defining fingers for holding the shoulder belt portion.

11. The positioning device of claim 10, wherein said at least one opening comprises slots in said plate-like element defining a plurality of fingers for adjustably holding the shoulder belt portion in a selected one of a plurality of deflected positions.

12. The positioning device of claim 11, wherein said plate-like element is flexible.

13. The positioning device of claim 10, wherein said plate-like element is flexible.

14. A positioning device for use in combination with a vehicle seat belt assembly including webbing connected to a retraction device and extending at a relatively upper end from a force diverter and secured at a relatively lower end to an anchor, and including a latch plate insertable into a buckle and having an opening through which the webbing slides to define a shoulder belt portion between the relatively upper end and the latch plate, and a lap belt portion between the relatively lower end and the latch plate, said positioning device comprising:

a clamping element frictionally engagable with the shoulder belt portion and positionable immediately adjacent the latch plate so as to maintain the lap belt portion in a desired snug condition when the latch plate is inserted into the buckle by preventing sliding of the webbing through the opening in a direction which would loosen the lap belt portion, while permitting sliding of the webbing through the opening in a direction which would further tighten the lap belt portion; and an outrigger element attached to said clamping element and formed so as to extend generally downwardly in a buckled-up configuration past the opening and to bear against the latch plate for preventing rotation of said clamping element towards the opening.

15. A positioning device for use in combination with a vehicle seat belt assembly including webbing connected to a retraction device and extending at a relatively upper end from a force diverter and secured at a relatively lower end to an anchor, and including a latch plate insertable into a buckle and having an opening through which the webbing slides to define a shoulder belt portion between the relatively upper end and the latch plate, and a lap belt portion between the relatively lower end and the latch plate, said positioning device comprising:

a clamping element frictionally engagable with the shoulder belt portion and positionable immediately adjacent the latch plate so as to maintain the lap belt portion in a desired snug condition when the latch plate is inserted into the buckle by preventing sliding of the webbing through the opening in a direction which would loosen the lap belt portion, while permitting sliding of the webbing through the opening in a direction which would further tighten the lap belt portion;

said clamping element including a back portion and a cover portion positionable on opposite sides of the webbing, said back portion contacting the latch plate in a buckled-up configuration; and said positioning device further comprising an outrigger element attached to said cover portion and formed so as to extend generally downwardly in the buckled-up configuration past the opening and to bear against the latch plate for preventing rotation of said clamping element towards the opening.

16. The positioning device of claim 15, which further comprises a hand-engaging element attached to said cover portion and extending generally upwardly in the buckled-up configuration to aid in inserting the latch plate into the buckle.

17. A positioning device for use in combination with a vehicle seat belt assembly including webbing connected to a retraction device and extending at a relatively upper end from a force diverter and secured at a relatively lower end to an anchor, and including a latch plate insertable into a buckle and having an opening through which the webbing slides to define a shoulder belt portion between the relatively upper end and the latch plate, and a lap belt portion between the relatively lower end and the latch plate, said positioning device comprising:

a clamping element frictionally engagable with the shoulder belt portion and positionable immediately adjacent the latch plate so as to maintain the lap belt portion in a desired snug condition when the latch plate is inserted into the buckle by preventing sliding of the webbing through the opening in a direction which would loosen the lap belt portion, while permitting sliding of the webbing through the opening in a direction which would further tighten the lap belt portion;

said clamping element including a back portion and a cover portion positionable on opposite sides of the webbing, said back portion having at least one rear contact surface defining a plane of contact with the latch plate in a buckled-up configuration; and said positioning device further comprising an outrigger element attached to said cover portion and formed so as to extend generally downwardly in the buckled-up configuration past the opening to a distal end generally within an extension of the plane of contact to bear against the latch plate for preventing rotation of said clamping element towards the opening.

18. The positioning device of claim 17, which further comprises a hand-engaging element attached to said cover portion and extending generally upwardly in the buckled-up configuration to aid in inserting the latch plate into the buckle.

19. A positioning device for use in combination with a vehicle seat belt assembly including webbing connected to a retraction device and extending at a relatively upper end from a force diverter and secured at a relatively lower end to an anchor, and including a latch plate insertable into a buckle and having an opening through which the webbing slides to define a shoulder belt portion between the relatively upper end and the latch plate, and a lap belt portion between the relatively lower end and the latch plate, said positioning device comprising:

a clamping element frictionally engagable with the shoulder belt portion and positionable immediately adjacent the latch plate so as to maintain the lap belt portion in a desired snug condition when the latch plate is inserted into the buckle by preventing sliding of the webbing through the opening in a direction which would loosen the lap belt portion, while permitting sliding of the webbing through the opening in a direction which would further tighten the lap belt portion;

said clamping element including a back portion and a cover portion positionable on opposite sides of the webbing, said back portion contacting the latch plate in a buckled-up configuration; and said positioning device further comprising an outrigger element attached to said back portion and formed so as to extend generally downwardly in the buckled-up configuration past the opening and to bear against the latch plate for preventing rotation of said clamping element towards the opening.

20. A positioning device for use in combination with a vehicle seat belt assembly including webbing extending at a relatively upper end from a retraction device and secured at a relatively lower end to an anchor, and including a latch plate insertable into a buckle and having an opening through which the webbing slides to define a shoulder belt portion between the relatively upper end and the latch plate, and a lap belt portion between the relatively lower end and the latch plate, said positioning device comprising:

a clamping element frictionally engagable with the shoulder belt portion and positionable immediately adjacent the latch plate so as to maintain the lap belt portion in a desired snug condition when the latch plate is inserted into the buckle by preventing sliding of the webbing through the opening in a direction which would loosen the lap belt portion, while permitting sliding of the webbing through the opening in a direction which would further tighten the lap belt portion, said clamping element including a back portion and a cover portion positionable on opposite sides of the webbing, the back portion contacting the latch plate in a buckled-up configuration, and at least one adjustable tightening device connected to said back portion and to said cover portion for developing a clamping force between said back portion and said cover portion; and a shoulder belt repositioning element attached to said back portion.

21. A positioning device for use in combination with a vehicle seat belt assembly including webbing extending at a relatively upper end from a retraction device and secured at a relatively lower end to an anchor, and including a latch plate insertable into a buckle and having an opening through which the webbing slides to define a shoulder belt portion between the relatively upper end and the latch plate, and a lap belt portion between the relatively lower end and the latch plate, said positioning device comprising:

a clamping element frictionally engagable with the shoulder belt portion and positionable immediately adjacent the latch plate so as to maintain the lap belt portion in a desired snug condition when the latch plate is inserted into the buckle by preventing sliding of the webbing through the opening in a direction which would loosen the lap belt portion, while permitting sliding of the webbing through the opening in a direction which would further tighten the lap belt portion, said clamping element including a back portion and a cover portion positionable on opposite sides of the webbing, the back portion contacting the latch plate in a buckled-up configuration, and at least one adjustable tightening device connected to said back portion and to said cover portion for developing a clamping force between said back portion and said cover portion;

a shoulder belt repositioning element attached to said back portion; and an outrigger element attached to said cover portion and formed so as to extend generally downwardly in the buckled-up configuration past the opening and to bear against the latch plate for preventing rotation of said clamping element towards the opening.

22. A positioning device for use in combination with a vehicle seat belt assembly including webbing extending at a relatively upper end from a retraction device and secured at a relatively lower end to an anchor, and including a latch plate insertable into a buckle and having an opening through which the webbing slides to define a shoulder belt portion between the relatively upper end and the latch plate, and a lap belt portion between the relatively lower end and the latch plate, said positioning device comprising:

a clamping element frictionally engagable with the shoulder belt portion and positionable immediately adjacent the latch plate so as to maintain the lap belt portion in a desired snug condition when the latch plate is inserted into the buckle by preventing sliding of the webbing through the opening in a direction which would loosen the lap belt portion, while permitting sliding of the webbing through the opening in a direction which would further tighten the lap belt portion, said clamping element including
- a back portion and a cover portion positionable on opposite sides of the webbing, the back portion contacting the latch plate in a buckled-up configuration, and
- at least one adjustable tightening device connected to said back portion and to said cover portion for developing a clamping force between said back portion and said cover portion;
- a shoulder belt repositioning element attached to said back portion; and said back portion having at least one rear contact surface defining a place of contact with the latch plate in the buckled-up configuration; and said positioning device further comprising an outrigger element attached to said cover portion and formed so as to extend generally downwardly in the buckled-up configuration past the opening to a distal end generally within an extension of the plane of contact to bear against the latch plate for preventing rotation of said clamping element towards the opening; and wherein said shoulder belt repositioning element comprises a plate-like element extending generally perpendicularly to the plane of contact and having at least one opening defining fingers for holding the shoulder belt portion.

23. The positioning device of claim 22, wherein said plate-like element is flexible.

* * * * *